US012357951B2

(12) United States Patent
Shi et al.

(10) Patent No.: US 12,357,951 B2
(45) Date of Patent: Jul. 15, 2025

(54) COMPOSITE MEMBRANE AND METHODS OF FABRICATION THEREOF

(71) Applicant: National University of Singapore, Singapore (SG)

(72) Inventors: Guimin Shi, Singapore (SG); Tai-Shung Neal Chung, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 405 days.

(21) Appl. No.: 17/795,746

(22) PCT Filed: Jan. 29, 2021

(86) PCT No.: PCT/SG2021/050043
§ 371 (c)(1),
(2) Date: Jul. 27, 2022

(87) PCT Pub. No.: WO2021/158173
PCT Pub. Date: Aug. 12, 2021

(65) Prior Publication Data
US 2023/0093327 A1    Mar. 23, 2023

(30) Foreign Application Priority Data
Feb. 6, 2020    (SG) .............. 10202001089U

(51) Int. Cl.
*B01D 71/36*    (2006.01)
*B01D 61/36*    (2006.01)
(Continued)

(52) U.S. Cl.
CPC ........... *B01D 71/36* (2013.01); *B01D 61/362* (2013.01); *B01D 61/363* (2022.08);
(Continued)

(58) Field of Classification Search
CPC .... B01D 71/36; B01D 61/362; B01D 61/363; B01D 67/0002; B01D 67/0095;
(Continued)

(56) References Cited

U.S. PATENT DOCUMENTS 5,051,114 A * 9/1991 Nemser ............... B01D 71/76
                                                                 95/55
5,928,792 A * 7/1999 Moya ................. B01D 67/0088
                                                                428/421

(Continued)

FOREIGN PATENT DOCUMENTS

CN    1326996 A  * 12/2001 ........... C07C 313/20
CN    102698618 A * 10/2012 ........... B01D 61/364
(Continued)

OTHER PUBLICATIONS

English translation of patent publication CN 1326996, published Dec. 19, 2001. (Year: 2001).*
(Continued)

*Primary Examiner* — Joseph W Drodge
(74) *Attorney, Agent, or Firm* — Edwin S. Flores; Daniel J. Chalker; Chalker Flores, LLP

(57) ABSTRACT

The present invention relates, in general terms, to a composite membrane for use in filtration. The present invention also relates to a method of fabricating the composite membrane, and a method of filtrating using the composite membrane as disclosed herein. The method of fabricating a composite membrane comprising contacting a perfluorinated polymer solution with a surface of a polymer layer and drying the perfluorinated polymer solution at a relative humidity of less than 20% to form a perfluorinated polymer layer physisorbed on the surface of the polymer layer.

12 Claims, 13 Drawing Sheets

(51) Int. Cl.
    *B01D 67/00*     (2006.01)
    *B01D 69/02*     (2006.01)
    *B01D 69/10*     (2006.01)
    *B01D 69/12*     (2006.01)
    *B01D 71/26*     (2006.01)

(52) U.S. Cl.
    CPC ..... *B01D 67/0002* (2013.01); *B01D 67/0095* (2013.01); *B01D 69/02* (2013.01); *B01D 69/105* (2013.01); *B01D 69/106* (2022.08); *B01D 69/107* (2022.08); *B01D 69/1216* (2022.08); *B01D 71/261* (2022.08); *B01D 2323/12* (2013.01); *B01D 2323/219* (2022.08); *B01D 2323/46* (2013.01); *B01D 2323/50* (2013.01); *B01D 2325/04* (2013.01); *B01D 2325/06* (2013.01); *B01D 2325/20* (2013.01); *B01D 2325/38* (2013.01)

(58) Field of Classification Search
    CPC .... B01D 69/02; B01D 69/105; B01D 69/106; B01D 69/107; B01D 69/1216; B01D 71/261; B01D 2323/12; B01D 2323/219; B01D 2323/46; B01D 2323/50; B01D 2325/04; B01D 2325/06; B01D 2325/20; B01D 2325/38; B01D 71/32; B01D 63/081; B01D 67/0009; B01D 67/0011; B01D 67/00111; B01D 67/0048; B01D 69/122; B01D 2323/08; B01D 2323/2182
    See application file for complete search history.

(56) References Cited

U.S. PATENT DOCUMENTS

| | | | |
|---|---|---|---|
| 5,938,929 A | * | 8/1999 | Shimagaki ............. B01D 71/68 210/500.41 |
| 9,079,138 B2 | | 7/2015 | Nemser et al. |
| 2007/0256969 A1 | * | 11/2007 | Ding ............. B01D 71/38 96/11 |
| 2011/0266220 A1 | * | 11/2011 | Campos ................. B01D 71/76 585/818 |
| 2012/0097612 A1 | * | 4/2012 | Nemser ................. B01D 71/36 210/500.27 |
| 2014/0322518 A1 | * | 10/2014 | Addleman ........... B01D 69/125 427/244 |
| 2017/0189864 A1 | * | 7/2017 | Gilron ................... C07C 51/47 |
| 2018/0111098 A1 | | 4/2018 | Majumdar et al. |
| 2018/0133660 A1 | | 5/2018 | Shangguan et al. |
| 2018/0264399 A1 | | 9/2018 | Deng et al. |
| 2018/0333675 A1 | * | 11/2018 | Liu .................... B01D 69/1216 |
| 2020/0030746 A1 | | 1/2020 | Sirkar et al. |

FOREIGN PATENT DOCUMENTS

| | | | | |
|---|---|---|---|---|
| CN | 103463995 B | | 9/2015 | |
| CN | 107847868 A | * | 3/2018 | ........... B01D 53/228 |
| KR | 20100099530 A | * | 9/2010 | ........... B01D 63/081 |
| WO | WO-2016201222 A1 | * | 12/2016 | ........... B01D 53/228 |

OTHER PUBLICATIONS

English translation of patent publication KR 20100099530-A, published Sep. 13, 2010. (Year: 2010).*
English translation of patent publication CN 102698618 A, published Oct. 3, 2012. (Year: 2012).*
English translation of Patent Publication CN 107847868-A, published Mar. 27, 2018. (Year: 2018).*
3M Data Sheet 3M Fluorinet Electronic Liquid FC-770, Technical Data, Sep. 2019. (Year: 2019).*
3M Fluorinet Electronic Liquid FC-770, Request a Quote, undated, presumed available 2019. (Year: 2019).*
Written Opinion, PCT/SG2021/050043 dated Apr. 22, 2021.

* cited by examiner

| Feed | Permeance, (L·m⁻²·hr⁻¹·bar⁻¹) | TG rejection, (%) |
|---|---|---|
| Oil in acetone (20 wt%) | 0.36 ± 0.20 | 99.95 ± 0.05 |
| Oil in n-hexane (20 wt%) | 1.50 ± 0.07 | 99.95 ± 0.04 |

Figure 12

COMPOSITE MEMBRANE AND METHODS OF FABRICATION THEREOF

CROSS-REFERENCE TO RELATED APPLICATIONS

This application is the National Stage of International Application No. PCT/SG2021/050043, filed on Jan. 29, 2021 claiming the priority of SG 10202001089U, filed on Feb. 6, 2020, the content of each of which is incorporated by reference herein.

TECHNICAL FIELD

The present invention relates, in general terms, to a composite membrane for use in filtration. The present invention also relates to a method of fabricating the composite membrane, and a method of filtrating using the composite membrane as disclosed herein.

BACKGROUND

The global production of edible oils was ~182 million tons in 2016/2017. Currently, the oils are produced mainly through solvent extraction processes, which use a huge amount of solvents such as n-hexane to extract them. The solvents are then recovered by energy intensive thermal processes. This is not ideal as the wastage is high and the process expensive.

Organic solvent nanofiltration (OSN) has emerged as a promising liquid separation process for many industries because of its simplicity and energy efficiency. OSN has been applied to separate compounds with a molecular weight (MW) from 200 to 1000 g/mol from organic solvents in chemical, pharmaceutical and vegetable oil industries. The heart of OSN processes is the solvent-resistant nanofiltration membrane which is able to separate the compounds from organic solvents and remains stable in the solvents.

Currently, polymeric OSN membranes are mainly made of polyimide or cross-linked polyimide, cross-linked polybenzimidazole, cross-linked silicon, and poly (ether ether ketone) (PEEK). Most of the membranes require cross-linking modifications in order to be chemically stable in harsh solvents. In addition, they need to be further impregnated with pore preserving agents such as polyethylene glycol to maintain their pore structure. Once the pore preserving agents are removed, the membranes must be kept in a wet state in order to prevent them from developing cracks. Among the aforementioned OSN membranes, PEEK membranes do not need to be cross-linked and go through pore preservation. However, PEEK can only be dissolved in very harsh solvents such as methane sulfonic acid and sulfuric acid during membrane fabrication, thus making large scale fabrication difficult.

The use of multiple chemicals for pore preserving and cross-linking (which are usually harsh) for the fabrication of membranes also make large scale fabrication expensive due to the extensive waste disposal that is required.

As mentioned, a further challenge is the compatibility of the membrane with the intended liquid separation process. The membrane needs to be robust enough to withstand repeated use without degradation or delamination. This is also why current research direction tends towards cross-linking modification as such modification makes the membrane suitably robust. However, cross-linking methods are time consuming and is a costly step.

It would be desirable to overcome or ameliorate at least one of the above-described problems, or at least to provide a useful alternative.

SUMMARY

The present invention is predicated on the discovery that water (on the surface of the membrane or in the environment) can critically influence the formation of composite membranes. In particular, it was found that a minute amount of water (and/or water vapour) can greatly influence the properties of the resultant composite membrane. In this regard, the inventors have found that by controlling at least the relative humidity (RH) during fabrication, a desirable composite membrane can be fabricated. Accordingly, a composite membrane with no or low amount of defects can be formed. The coating concentration of a polymer solution can also be controlled to further adjust the quality (permeance and/or retention) of the composite membrane. Such membranes are able to perform organic solvent separation processes without the use of cross-linking agents and/or pore preserving agents. This simplified method compared to the prior art is advantageous for fabricating composite membranes for organic solvent nanofiltration.

The present invention relates to a method of fabricating a composite membrane, comprising:
  a) contacting a perfluorinated polymer solution with a surface of a polymer layer; and
  b) drying the perfluorinated polymer solution to form a perfluorinated polymer layer physisorbed on the surface of the polymer layer;
  wherein the perfluorinated polymer solution comprises a perfluorinated polymer and a $C_5$-$C_{18}$ perfluorinated solvent; and
  wherein the perfluorinated polymer solution is dried at a relative humidity at less than 20%.

Advantageously, when the relative humidity is less than 20%, the porosity of the perfluorinated polymer layer is minimised such that the composite membrane has a good rejection rate while having an acceptable permeance. Further, the perfluorinated polymer layer does not delaminate from the polymer layer.

In some embodiments, the polymer layer is selected from polyolefin, polyester ether ketone (PEEK), polyethylene terephthalate (PET), Nylon, polyacrylonitrile (PAN), polytetrafluoroethylene (PTFE), polyetherimides, polyimides and their copolymers thereof. In some embodiments, the polymer layer is selected from polyolefin, polyester ether ketone (PEEK), polyethylene terephthalate (PET), Nylon, polyacrylonitrile (PAN) and their copolymers thereof.

The present invention also relates to a method of fabricating a composite membrane, comprising:
  a) contacting a perfluorinated polymer solution with a surface of a polyolefin layer; and
  b) drying the perfluorinated polymer solution to form a perfluorinated polymer layer physisorbed on the surface of the polyolefin layer;
  wherein the perfluorinated polymer solution comprises a perfluorinated polymer and a $C_5$-$C_{18}$ perfluorinated solvent; and
  wherein the perfluorinated polymer solution is dried at a relative humidity at less than 20%.

Advantageously, cross-linking agents and pore-preserving agents are not required to form the composite membrane. Further, an annealing step is not required.

In some embodiments, the relative humidity is 0%.

In some embodiments, the perfluorinated polymer solution is dried at an ambient temperature.

In some embodiments, the $C_5$-$C_{18}$ perfluorinated solvent is a perfluorinated polyether solvent.

In some embodiments, the $C_5$-$C_{18}$ perfluorinated solvent has a boiling point of less than 110° C.

In some embodiments, the perfluorinated polymer in the perfluorinated polymer solution has a concentration of about 0.001 wt/wt % to about 1.5 wt/wt %.

In some embodiments, the perfluorinated polymer in the perfluorinated polymer solution is selected from polytetrafluoroethylene (PTFE), fluorinated ethylene propylene copolymer (FEP), perfluoroalkyoxy alkane (PFA), ethylene tetrafluoroethylene (ETFE), or a copolymer thereof.

In some embodiments, the perfluorinated polymer is selected from poly[4,5-difluoro-2,2-bis(trifluoroethyl)-1,3-dioxole-co-tetrafluoroethylene] (PTFE AF 2400 or PTFE AF 1600) and poly(tetrafluoroethylene-co-2,2,4-trifluoro-5-trifluoromethoxy-1,3-dioxole) (Hyflon AD40 or Hyflon AD60) or a combination thereof.

In some embodiments, the perfluorinated polymer solution is contacted on the surface of the polyolefin layer for at least 5 sec.

In some embodiments, the step of contacting perfluorinated polymer solution (step a) includes removing excess perfluorinated polymer solution.

In some embodiments, the perfluorinated polymer solution is dried on the surface of the polyolefin layer for at least 10 sec.

In some embodiments, the method further comprises a step before (a) of wetting the polyolefin layer with a solvent having a boiling point of more than 90° C.

In some embodiments, the solvent is selected from toluene, butyl acetate, $C_3$-$C_8$ ketones, hexane, $C_3$-$C_6$ alcohol or a combination thereof.

In some embodiments, the $C_3$-$C_6$ alcohol is n-butanol.

In some embodiments, the method further comprises a step prior to (a) of anhydrously drying the polymer layer or polyolefin layer and perfluorinated polymer solution.

The present invention also relates to a composite membrane, comprising:
a) a polymer layer; and
b) a perfluorinated polymer layer physisorbed on a surface of the polymer layer;
wherein the perfluorinated polymer layer has a surface morphology with less than 10% of the surface comprising micro-structures; and
wherein the perfluorinated polymer layer has a thickness of about 5 nm to about 500 nm.

The present invention also relates to a composite membrane, comprising:
a) a polyolefin layer; and
b) a perfluorinated polymer layer physisorbed on a surface of the polyolefin layer;
wherein the perfluorinated polymer layer has a surface morphology with less than 10% of the surface comprising micro-structures; and
wherein the perfluorinated polymer layer has a thickness of about 50 nm to about 300 nm.

In some embodiments, the perfluorinated polymer layer has a surface morphology with no micro-structures.

In some embodiments, the micro-structures are holes.

In other embodiments, the micro-structures are less than 1 µm in diameter.

In some embodiments, the polyolefin in the polyolefin layer is selected from polyethylene or polypropylene.

In some embodiments, the polyolefin layer has a thickness of about 1 µm to about 10000 µm.

In some embodiments, the polyolefin layer is wetted with a solvent having a boiling point of more than 90° C.

In some embodiments, the composite membrane has a molecular weight cut-off (MWCO) of at least 150 g/mol in acetone.

In some embodiments, the composite membrane has a hexane permeance of at least 8.6 $L/m^{-2}$-h-bar.

In some embodiments, the composite membrane has an acetone permeance of at least 1.1 $L/m^{-2}$-h-bar.

In some embodiments, the composite membrane has a solute rejection of at least 80%.

The present invention also relates to a method of filtrating a chemical compound from a mixture, the mixture comprising the chemical compound and a liquid, the method comprising:
a) contacting the mixture with a composite membrane as disclosed herein; and
b) applying a pressure across the composite membrane.

The present invention also relates to a method of filtrating a mixture by pervaporation, the mixture comprising at least two fluids, the method comprising:
a) contacting the mixture with a composite membrane as disclosed herein; and
b) applying a pressure across the composite membrane.

The present invention also relates to a method of filtrating a gas and vapour mixture, the method comprising:
a) contacting the mixture with a composite membrane as disclosed herein; and
b) applying a pressure across the composite membrane.

BRIEF DESCRIPTION OF THE DRAWINGS

Embodiments of the present invention will now be described, by way of non-limiting example, with reference to the drawings in which:

FIG. 12 illustrates the performance of composite membrane in separating oil/acetone and oil/n-hexane under a transmembrane pressure of 10 bar at 25° C. (Feed: 20 wt % oil in acetone or n-hexane)

DETAILED DESCRIPTION

Figure 1:
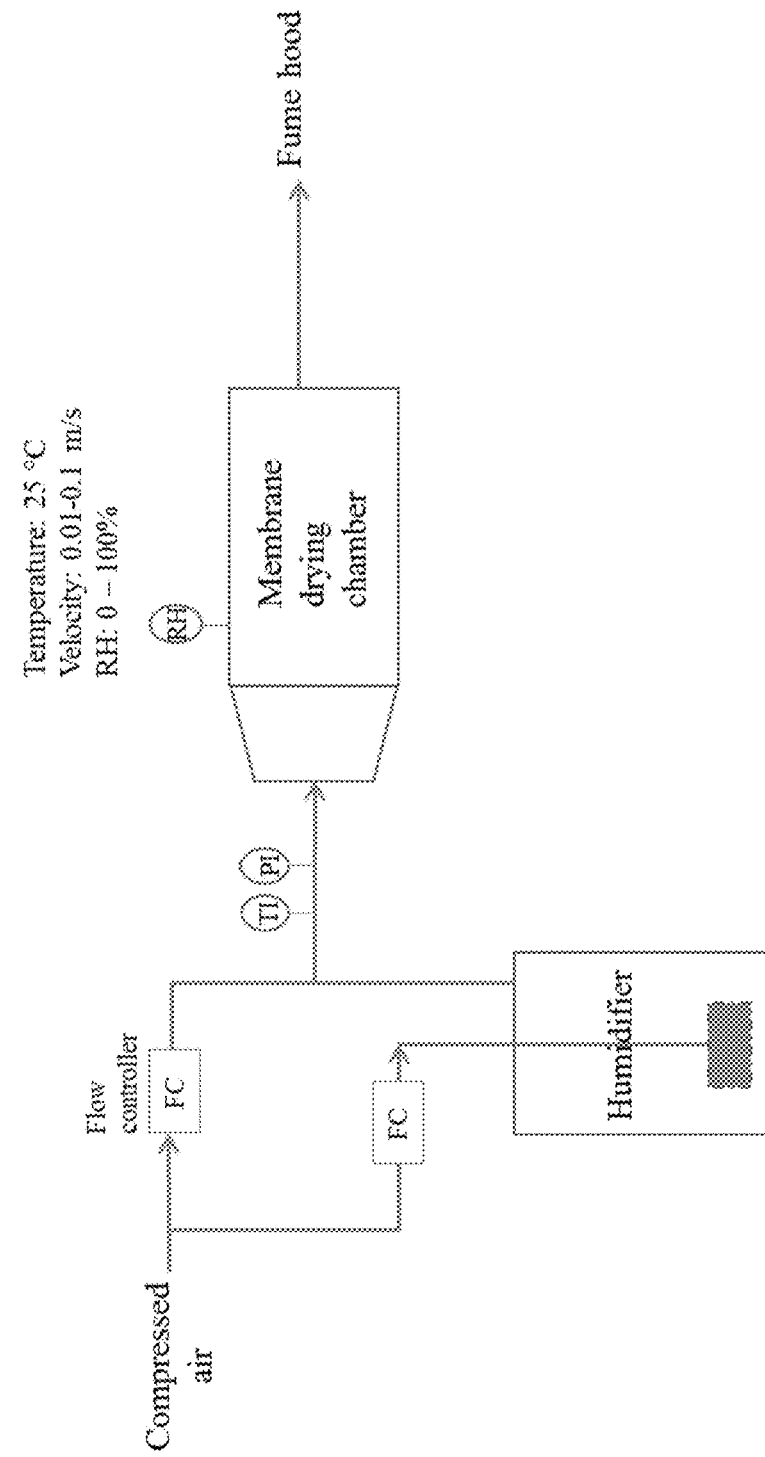
FIG. 1 illustrates a schematic of experimental set-up for membrane preparation.

Without wanting to be bound by theory, the inventors have set out to investigate various inherently inert materials so as to eliminate the cross-linking step which is commonly required in forming composite membranes. The inventors have found that perfluorinated polymer, when specifically processed and applied, can be suitable for use with polymer substrate as composite membranes in OSN applications. Perfluorinated polymer was found to have acceptable permeability, processibility, thermal resistance and outstanding chemical resistance even without cross-linking. In this regard, perfluorinated polymer was found to be able to withstand most chemicals such as acids, bases and organic solvents. The inventors have further found that the effects of water (and/or water vapour) (in particular relative humidity) influence membrane formation. Further, during the fabrication, the effects of perfluorinated polymer concentration can play a role in membrane performance for the separation of various solute/solvent mixtures.

The present invention relates to a method of fabricating a composite membrane, comprising:
a) contacting a perfluorinated polymer solution with a surface of a polymer layer; and
b) drying the perfluorinated polymer solution to form a perfluorinated polymer layer physisorbed on the surface of the polymer layer;
wherein the perfluorinated polymer solution comprises a perfluorinated polymer and a $C_5$-$C_{18}$ perfluorinated solvent; and
wherein the perfluorinated polymer solution is dried at a relative humidity at less than 20%.

In some embodiments, the polymer layer is selected from polyolefin, polyesther ether ketone (PEEK), polyethylene terephthalate (PET), Nylon, polyacrylonitrile (PAN), polytetrafluoroethylene (PTFE), polyetherimides, polyimides and their copolymers thereof.

The present invention relates to a method of fabricating a composite membrane, comprising:
a) contacting a perfluorinated polymer solution with a surface of a polymer layer, the polymer layer is selected from polyolefin, polyesther ether ketone (PEEK), polyethylene terephthalate (PET), Nylon, polyacrylonitrile (PAN) and their copolymers thereof; and
b) drying the perfluorinated polymer solution to form a perfluorinated polymer layer physisorbed on the surface of the polymer layer;
wherein the perfluorinated polymer solution comprises a perfluorinated polymer and a $C_5$-$C_{18}$ perfluorinated solvent; and
wherein the perfluorinated polymer solution is dried at a relative humidity at less than 20%.

Examples of Nylon are Nylon 66, Nylon 6, Nylon 510 and Nylon 1,6. Examples of commercially available Nylon are PA6 Lanxess Durethan B, PA11 Arkema Rilsan, PA12 Evonik Vestamid L, PA46 DSM Stanyl, PA410 DSM Ecopaxx, PA4T DSM Four Tii and PA66 DuPont Zytel. Examples of commercially available Nylon copolymers are PA6/66 DuPont Zytel, PA6/6T BASF Ultramid T (6/6T copolymer), PA6I/6T DuPont Selar PA, PA66/6T DuPont Zytel HTN and PA12/MACMI EMS Grilamid TR.

As used herein, 'copolymer' refers to a polymer made by reaction of two different monomers, with units of more than one kind. When polymers are miscible with each other, a 'blend' can be made. Two or more polymers can also react with one another (for example by transamidation) to form random copolymers. These are within the scope of 'copolymer'.

The polymer layer can take the form of a flat sheet or hollow fiber. Typically, a plurality of hollow fiber are bundled as a unit together within a single case such that the feed, permeate and retentate for all fibers in the unit flow through common feed, permeate and retentate stream ports, respectively. Such units are sometimes referred to as "modules".

In some embodiments, the polymer layer has a crystallinity of at least 10%. In other embodiments, the crystallinity is at least 20%, at least 30%, at least 40%, at least 50%, at least 60%, at least 70% or at least 80%. In other embodiments, the polymer layer has a crystallinity of about 10% to about 80%. In other embodiments, the crystallinity is about 20% to about 80%, about 30% to about 80%, about 40% to about 80%, or about 50% to about 80%. To this end, the polymer layer is at least porous to the eluent.

Advantageously, by selecting an appropriate polymer layer, and further within this range of crystallinity, the polymer substrate can provide strength and rigidity to the composite membrane.

The inventors have found that polyolefin membranes can further advantageously be employed as a substrate support for OSN membranes. Not only can it significantly lower the substrate material cost but also mitigate the complicated cross-linking process because polyolefin has excellent chemical resistance for a wide range of solvents. Further, cross-linking is not needed because the materials are inert to the solvents. In addition, the polyolefin substrate does not require the use of pore-preserving agents to maintain its pore structure. As a result, the fabrication process of OSN membranes can be greatly simplified.

Accordingly, the present invention relates to a method of fabricating a composite membrane, comprising:
a) contacting a perfluorinated polymer solution with a surface of a polyolefin layer; and
b) drying the perfluorinated polymer solution to form a perfluorinated polymer layer physisorbed on the surface of the polyolefin layer;
wherein the perfluorinated polymer solution comprises a perfluorinated polymer and a $C_5$-$C_{18}$ perfluorinated solvent; and
wherein the perfluorinated polymer solution is dried at a relative humidity at less than 20%.

The polymer (or polyolefin) layer and the perfluorinated polymer layer forms the composite membrane.

The polyolefin can be a thermoplastic or an elastomer. The polyolefin layer can be selected from polyethylene, polypropylene, polymethylpentene (PMP), polybutene-1 (PB-1), polyisobutylene (PIB), ethylene propylene rubber (EPR), ethylene propylene diene monomer (M-class) rubber (EPDM rubber), or their copolymer thereof. In other embodiments, the polyolefin layer can be selected from polyethylene, polypropylene, or a copolymer thereof. For example, the polyolefin layer can be a polyethylene substrate (layer). For example, commercially available ultrahigh MW PE substrate with a nominal pore size of 5 nm can be used for the deposition of Teflon AF2400. As presented in Table 1, the acetone permeance of the PE substrate is 412 L/$m^2$-h-bar with no rejection to RB. After the deposition of a Teflon AF2400 membrane on the PE support as described herein (for example), the permeance is decreased to 0.22 L/$m^2$-h-bar and the rejection to RB is increased to 99.5%.

TABLE 1

A comparison of separation performance between composite membranes prepared with and without pre-wetting in 0% RH for the separation of acetone/RB under a transmembrane pressure of 10 bar at 25° C. (Feed: RB in acetone 50 ppm).

| Membrane | Permeance, (L/$m^2$-h-bar) | RB rejection, (%) |
|---|---|---|
| PE 5nm | 412 ± 125 | 0 |
| Teflon AF2400/PE without pre-wetting[a] | 0.22 ± 0.07 | 99.5 ± 0.5 |
| Teflon AF2400/PE pre-wetted with n-butanol[a] | 1.15 ± 0.24 | 99.2 ± 0.8 |

[a]The coating solution is 0.5 wt % Teflon AF2400/HT80.

In some embodiments, the polymer layer (or polyolefin layer) has a thickness of about 1 μm to about 10000 μm. In other embodiments, the thickness is about 1 μm to about 9000 μm, about 1 μm to about 8000 μm, about 1 μm to about 7000 μm, about 1 μm to about 6000 μm, about 1 μm to about 5000 μm, about 1 μm to about 4000 μm, about 1 μm to about 3000 μm, about 1 μm to about 2000 μm, about 1 μm to about 1000 μm, or about 10 μm to about 1000 μm. In other embodiments, the polymer layer (or polyolefin layer) has a thickness of about 10 μm to about 100 μm. In other embodiments, the thickness is about 10 μm to about 90 μm, about 10 μm to about 80 μm, about 10 μm to about 70 μm, about 10 μm to about 60 μm, about 10 μm to about 50 μm or about 10 μm to about 40 μm. In other embodiments, the thickness is about 10 μm, about 20 μm, about 30 μm, about 40 μm, about 50 μm, about 60 μm, about 70 μm, about 80 μm, about 90 μm or about 100 μm. The inventors have found that when the thickness is as disclosed, the composite has a suitable mechanical strength for applications in OSN.

In some embodiments, the polymer layer (or polyolefin layer) comprises pores with a diameter of about 2 nm to about 500 nm. In other embodiments, the diameter is about 2 nm to about 400 nm, about 2 nm to about 300 nm, about 2 nm to about 200 nm, about 2 nm to about 100 nm, about 2 nm to about 90 nm, about 2 nm to about 80 nm, about 2 nm to about 70 nm or about 2 nm to about 60 nm. In other embodiments, the diameter is about 2 nm, about 3 nm, about 4 nm, about 5 nm, about 7 nm, about 10 nm, about 15 nm, about 20 nm, about 50 nm, about 100 nm, about 200 nm, about 300 nm, about 400 nm or about 500 nm. The inventors have found that these diameter sizes are desirable for OSN applications.

The perfluorinated polymer layer is in contact with a surface of the polymer layer (or polyolefin layer). In some embodiments, the perfluorinated polymer layer coats the surface of the polymer layer (or polyolefin layer). In this regard, while the perfluorinated polymer layer is in contact with, and can penetrate the polymer layer (or polyolefin layer), there is no cross-linking between both layers. In this sense, the perfluorinated polymer layer is physisorbed (physical adsorption) on a surface of the polymer layer (or polyolefin layer). Physisorption occurs when the intermolecular attractive forces between the perfluorinated polymer and polymer layer (or polyolefin layer) are greater than those with the solvent. Such adsorption involves intermolecular forces (van der Waals forces), electrostatic forces due to dipolar attraction and hydrogen bonding, and do not involve a significant change in the electronic orbital patterns of the species involved. The typical binding energy of physisorption is about 10-100 meV. This means that the chemical identity of both the perfluorinated polymer layer and the polymer layer (or polyolefin layer) is not altered. This is advantageous for forming composite membranes as harsh cross-linking chemicals are not used and the fabrication process is as well shortened. The use of pore-preserving agents can also be avoided.

As used herein, a perfluorinated polymer is an organofluorine compound containing only carbon-fluorines and C—C bonds. Other heteroatoms can also be included.

The perfluorinated polymer in the perfluorinated polymer layer or solution can be is selected from polytetrafluoroethylene (PTFE), fluorinated ethylene propylene copolymer (FEP), perfluoroalkyoxy alkane (PFA), ethylene tetrafluoroethylene (ETFE), or a copolymer thereof. For example, the perfluorinated polymer layer can be poly[4,5-difluoro-2,2-bis(trifluoromethyl)-1,3-dioxole-co-tetrafluoroethylene] (PTFE AF), which can have a molecular weight of 2,400 g/mol (PTFE AF 2400) or a molecular weight of 1,600 g/mol (PTFE AF 1600). Another example is poly(tetrafluoroethylene-co-2,2,4-trifluoro-5-trifluoromethoxy-1,3-dioxole) (TTD-TFE copolymer), which can have about 40% of the copolymer being TTD (Hyflon AD40) or 60% of the copolymer being TTD (Hyflon AD60). Other examples are poly(ethylene-co-tetrafluoroethylene) and tetrafluoroethylene-perfluoro(alkoxy vinyl ether). Other examples of perfluorinated polymer includes Teflon AF2400, Hyflon AD and Cytop.

Figure 2:
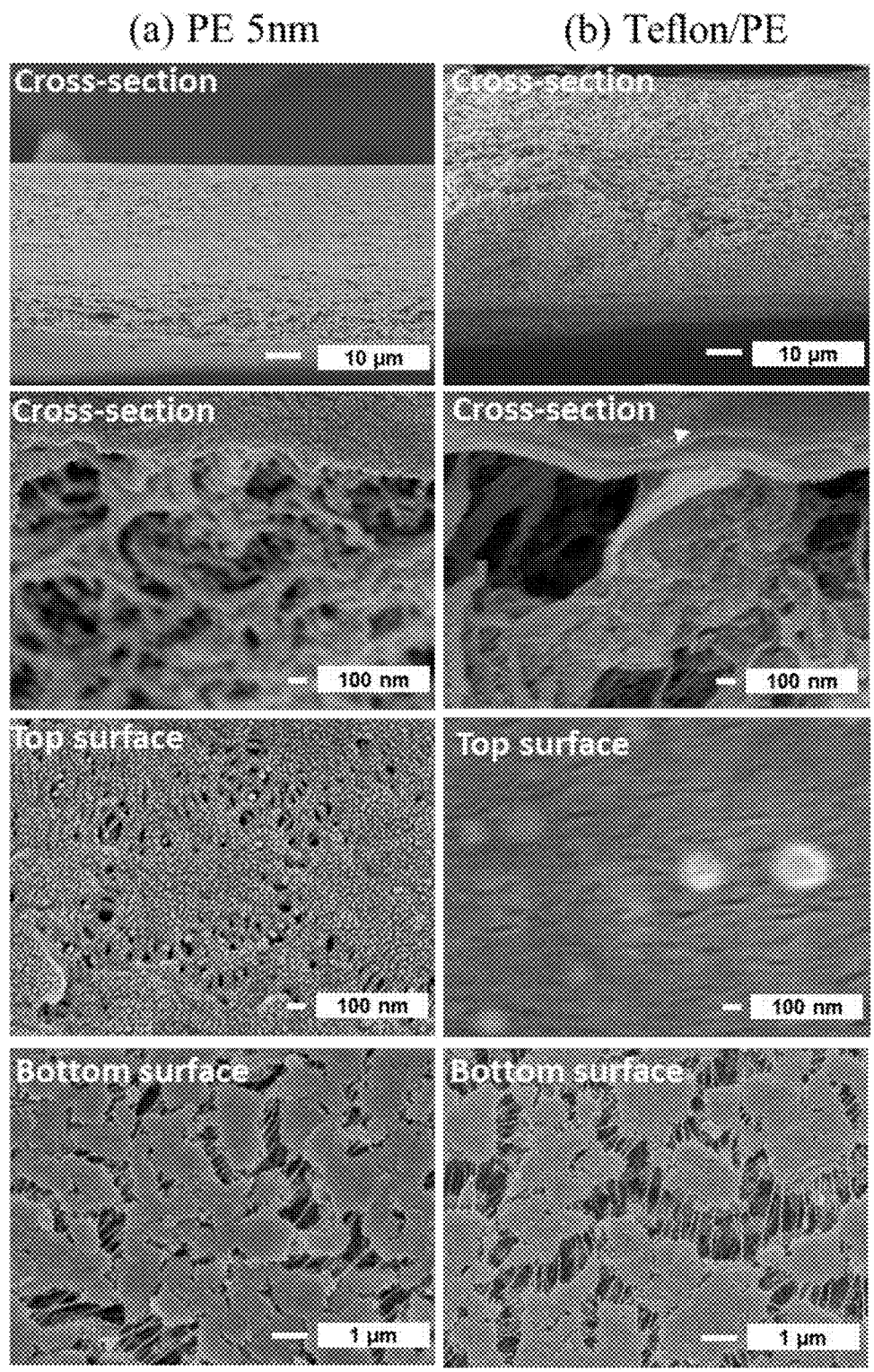
FIG. 2 illustrates membrane morphologies of (a) PE 5 nm and (b) composite membrane prepared with 0.5 wt % Teflon (PTFE AF 2400) concentration in 0% RH.

FIG. 2a illustrates an example of the composite membrane of the present invention, and presents the membrane morphology of the PE support with an asymmetric structure. It has a less porous top surface, enabling an ultrathin selective layer to be deposited on it. By coating a Teflon AF2400 solution on it for 15 seconds, a Teflon layer is formed on the PE surface as indicated in FIG. 2b. The resultant Composite membrane has a smooth surface morphology with an ultrathin Teflon layer of ~100 nm observed from its cross-section.

Figure 3:
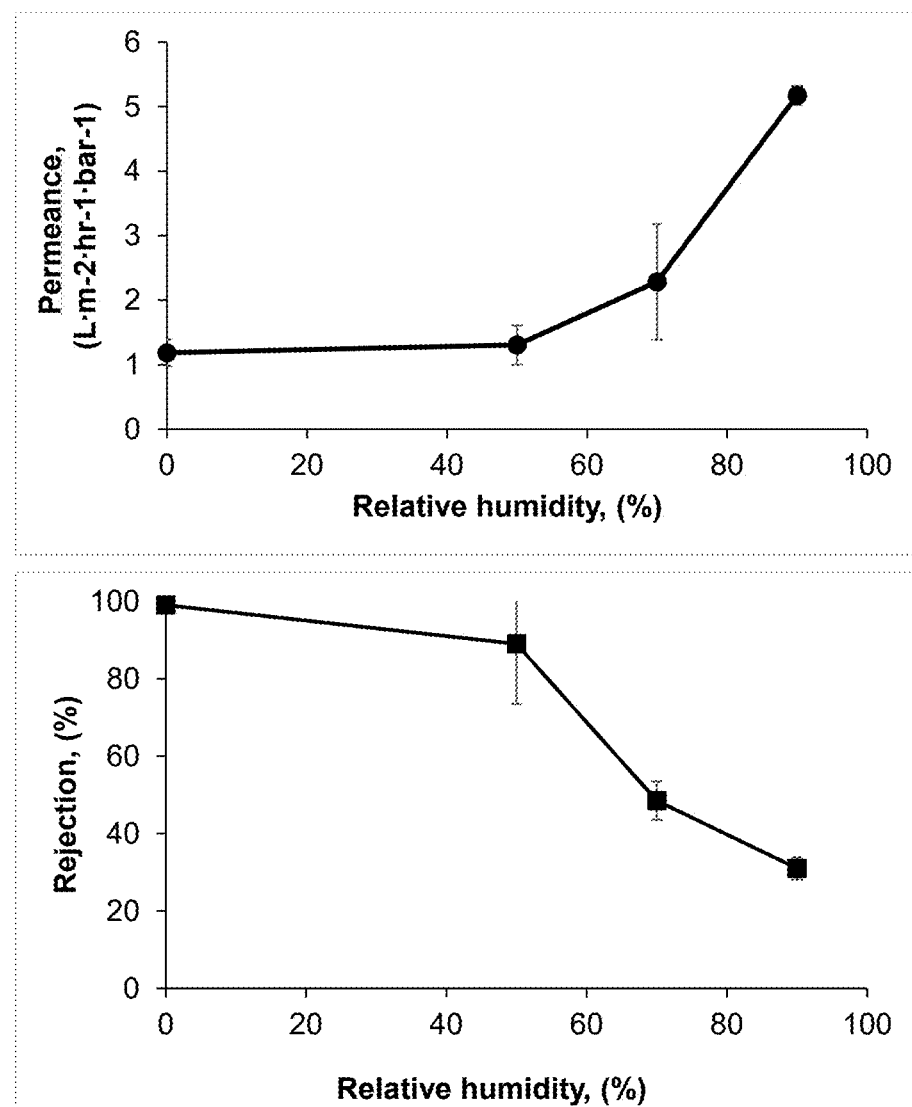
FIG. 3 illustrates the separation performance of composite membranes prepared with 0.5 wt % Teflon concentration in different RH from 0 to 90% under a transmembrane pressure of 10 bar at 25° C. (Feed: 50 ppm RB in acetone)
Figure 4:
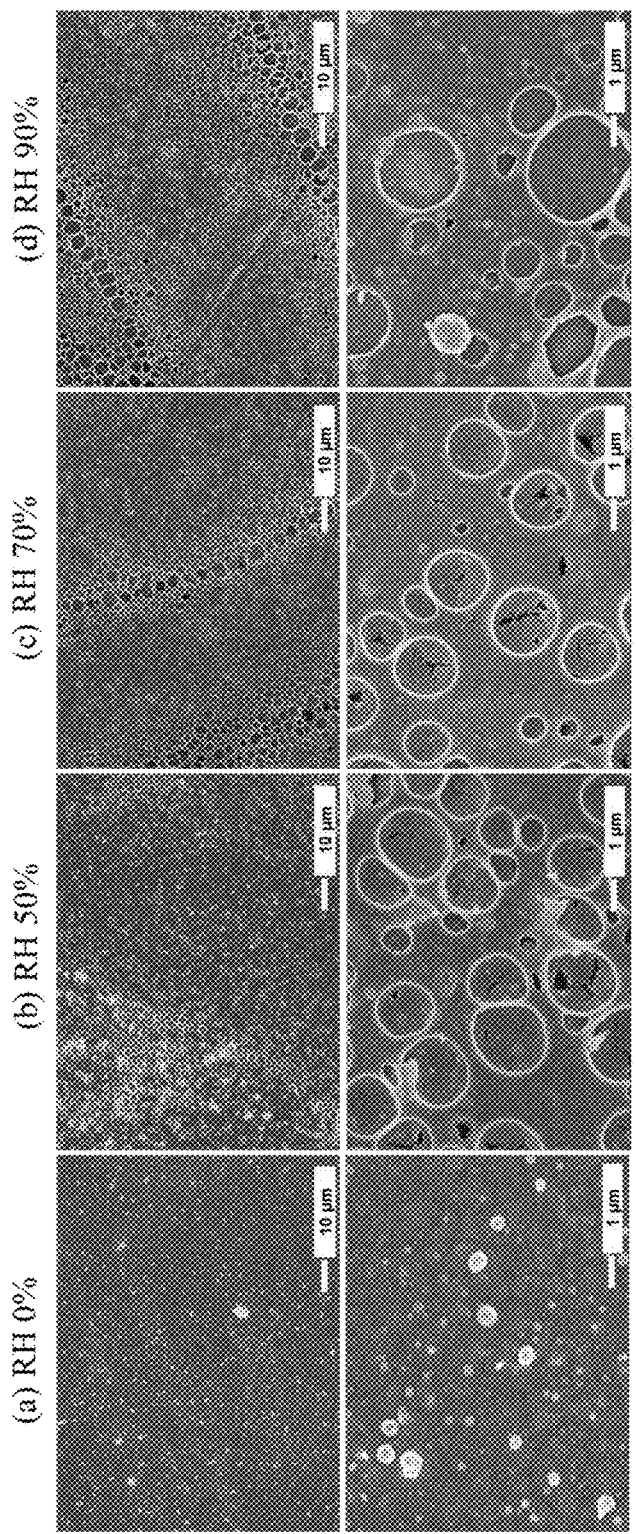
FIG. 4 illustrates the surface morphology of composite membranes prepared with 0.5 wt % Teflon concentration in RH of (a) 0, (b) 50, (c) 70 and (d) 90%.
Figure 5:
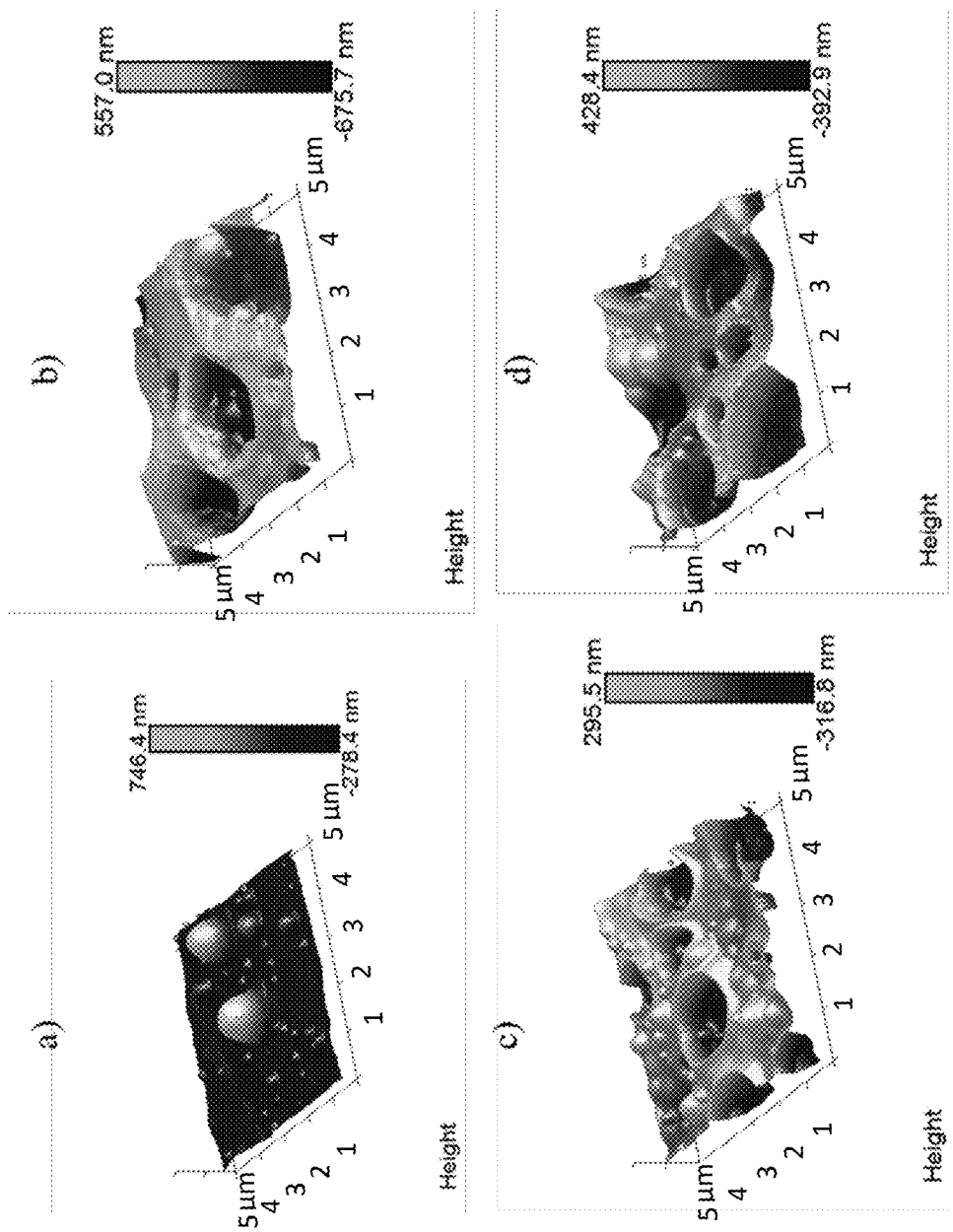
FIG. 5 illustrates the surface topology of composite membranes prepared with 0.5 wt % Teflon concentration in RH of a) 0, b) 50, c) 70 and d) 90%.

Without wanting to be bound by theory, the inventors believed that the presence of water and in particular water vapor in air and on the surface of the polymer layer (or polyolefin layer) can contribute to the honeycomb structure of the prefluorinated layer (coating layer) because of the localized condensation of water vapor. This was investigated by varying the relative humidity (RH) of a test chamber. FIG. 3 shows the evolution of acetone permeance and rejection of Rose Bengal (RB, MW=1017 g/mole) as a function of composite membranes prepared under different RH. An increase in RH in the drying chamber leads to an increase in permeance and a decrease in rejection to RB for the separation of an acetone/RB mixture. This may arise from the effects of defects formed on the composite membranes under high RH. FIG. 4 confirms the presence of the defects because there are honeycomb like structures on composite membranes prepared in air with RH of 50, 70 and 90%. In addition, the higher RH results in more honeycomb structures with larger circle diameters in the honeycomb. In contrast, there is little or no honeycomb surface structure on the composite membrane prepared under dry air (at RH 0%). The honeycomb structures may induce defects on the ultra-thin Teflon layer. FIG. 5 elucidates the details of the honeycomb structures; they are around a few hundred nm in depth. Since the selective layer in this composite membrane example has a thickness of ~100 nm, the large depth may lead to defects in the selective layer. Therefore, by drying of the as-coated Teflon membranes under dry air, defects can be avoided.

In some embodiments, the relative humidity (RH) is at less than about 15%, less than about 10%, less than about 9%, less than about 8%, less than about 7%, less than about 6%, less than about 5%, less than about 4%, less than about 3%, less than about 2% or less than about 1%. In other embodiments, the RH is about 0%.

The perfluorinated polymer can be dispersed in a suitable solvent to form the perfluorinated polymer solution. If the perfluorinated polymer solution is dried at ambient temperature, the boiling point of the solvent should be suitably selected such that it is not too high. In this regard, the inventors have found that a $C_5$-$C_{18}$ perfluorinated solvent can be advantageous as it reasonably disperses/dissolves the perfluorinated polymer and can be readily evaporated to form the perfluorinated polymer layer. For example, Fluorinert FC-40 or Fluorinert FC-72 can be used as a solvent. Alternatively, a perfluorinated polyether solvent can be used. An example of a suitable perfluorinated polyether solvent is Galden HT55, Galden HT70, Galden HT80, Galden HT110 and Galden HT 135, which are commercially available.

The term 'solvent' used herein refers to a solvent or solvent system, and which comprises of mainly of the particular solvent. Solvent systems refer to combinations of solvents which resulting in a final single phase. Accordingly, '$C_5$-$C_{18}$ perfluorinated solvent' also refers to a $C_5$-$C_{18}$ perfluorinated solvent system which comprises mainly of $C_5$-$C_{18}$ perfluorinated solvent. The mixture can further comprise other polar or non-polar solvents, and/or protic or aprotic solvents. Both 'solvents' and 'solvent systems' can include, and is not limited to, pentane, cyclopentane, hexane, cyclohexane, benzene, toluene, dioxane, chloroform, diethylether, dichloromethane, tetra hydrofuran, ethyl acetate, acetone, dimethylformamide, acetonitrile, dimethyl sulfoxide, nitromethane, propylene carbonate, formic acid, butanol, isopropanol, propanol, ethanol, methanol, acetic acid, ethylene glycol, diethylene glycol or other miscible liquid polymers.

The solvent can a mixture of a $C_5$-$C_{18}$ perfluorinated solvent and a non-perfluorinated solvent. For example, a mixture of perfluorinated polyether and non-perfluorinated polyether can be used.

A solvent that is not readily evaporable can result in a lengthy drying step, which is not desirable. In some embodiments, the $C_5$-$C_{18}$ perfluorinated solvent has a boiling point of less than 110° C. In other embodiments, the $C_5$-$C_{18}$ perfluorinated solvent has a boiling point of less than 100° C., less than 90° C., less than 80° C., less than 70° C., less than 60° C. or less than 50° C. In other embodiments, the $C_5$-$C_{18}$ perfluorinated solvent has a boiling point of about 60° C. to about 90° C.

In some embodiments, the $C_5$-$C_{18}$ perfluorinated solvent has a vapour pressure of more than 0.2 kPa at about 25° C. In other embodiments, the vapour pressure is more than 0.3 kPa, 0.4 kPa, 0.5 kPa, 1 kPa or 2 kPa.

The inventors have found that the drying step, when performed under ambient temperature, is advantageous as it reduces the flowability of the perfluorinated polymer; i.e. viscosity is maintained. By doing so, the perfluorinated polymer is less inclined to enter the pores of the polymer layer (or polyolefin layer). Further, by controlling the vaporization of the perfluorinated solvent at a suitable temperature, the vapour pressure of the perfluorinated polymer layer is about equal to the pressure exerted on the perfluorinated polymer layer by the surrounding atmosphere such that vapour nuclei at discrete points are not formed which can result in defects.

For example, the perfluorinated polymer solvent can be dried in a drying chamber at 25° C. for at least 10 min with air of various relative humidity and at an air speed of 0.05 m/s. Alternatively, the perfluorinated polymer solvent can be dried in lesser amount of time if subjected to a higher air velocity. For example, the perfluorinated polymer solvent can be dried in a drying chamber at 25° C. for at least 5 min with air of various relative humidity and at an air speed of 0.5 m/s.

In some embodiments, the perfluorinated polymer solution is dried at an ambient temperature. In other embodiments, the perfluorinated polymer solution is dried at about 20° C., about 25° C., about 30° C., about 35° C., about 40° C. or about 45° C. In other embodiments, the perfluorinated polymer solution is dried at about 50° C., about 60° C., about 70° C., about 80° C., about 90° C. or about 100° C.

In some embodiments, the perfluorinated polymer solution is dried under an air flow of about 0.05 m/s. In other embodiments, the air flow is about 0.1 m/s, about 0.2 m/s, about 0.3 m/s, about 0.4 m/s, about 0.5 m/s, about 0.6 m/s, about 0.7 m/s, about 0.8 m/s, about 0.9 m/s, about 1 m/s or about 1.5 m/s.

Solvent evaporation can also be affected by the perfluorinated polymer, for example its concentration. Initially, evaporation is essentially equal to that of the neat solvents and is controlled by their volatilities. At some point in the process, solvent evaporation slows suddenly and diffusion becomes the limiting factor in this evaporative process. Plasticization increases solvent diffusion because solvent molecules will diffuse much faster through resins that are above their glass transition temperatures than through ones below. Small amounts of solvent are sometimes retained in the film for long periods of time. Their retention time depends on the types of perfluorinated polymer and solvents selected.

The inventors have found that during this drying process, the function of the solvent is to control flow characteristics as the layer forms. If solvent evaporation is too fast, the film will not level or wet the polymer layer (or polyolefin layer) which can cause defects in the perfluorinated layer such as poor adhesion. If solvent evaporation is too slow, the perfluorinated layer may sag and perhaps become too thin. If the solvent's activity decreases significantly during evaporation, precipitation can also occur resulting in poor perfluorinated layer formation. Thus, the evaporation rate of the solvent (temperature, humidity, duration, etc.) can have a major impact on quality.

In some embodiments, the drying on the surface of the polymer layer (or polyolefin layer) is for at least 10 sec, at least 20 sec, at least 30 sec, at least 1 min, at least 2 min, at least 3 min, at least 4 min or at least 5 min. In other embodiments, the drying is at least 10 min, at least 15 min, at least 20 min, at least 30 min, at least 40 min, at least 50 min or at least 60 min.

The drying of the perfluorinated polymer solution can result in the solvent being partially or completely removed. In some embodiments, the drying of the perfluorinated polymer solution result in at least 80% of the solvent being removed. In other embodiments, at least 85%, at least 90%, at least 92%, at least 94%, at least 96%, at least 98%, at least 99% or at least 99.5% of the solvent is removed. This can depend on the type of solvent used as well as the conditions mentioned above. For example, for Galden HT80 or HT70, as long as the relative humidity is controlled when the membrane is formed, no differences was observed in terms of separation performance between the composites that were dried overnight and those dried for at least 10 min. For other perfluorinated solvents, different timing or drying temperatures may be selected.

The concentration of the perfluorinated polymer in the perfluorinated polymer solution can result in a various perfluorinated polymer layer thickness. This can be advantageously controlled to obtain a composite membrane for various applications. For example, with a higher concentration, a thicker layer is formed, and accordingly, retention of solute can be improved.

The inventors have further found that the concentration should not be excessively high. This is because when a combination of PTFE AF 2400 and perfluorinated polyether solvent is used, a high concentration tends to result in a thicker perfluorinated polymer layer, which translates to greater transport resistance which leads to the reduced permeance and is disadvantageous.

In some embodiments, the perfluorinated polymer in the perfluorinated polymer solution has a concentration of about 0.25 wt/wt % to about 1.5 wt/wt %. In other embodiments, the concentration is about 0.25 wt/wt % to about 1.0 wt/wt %, or about 0.25 wt/wt %, about 0.5 wt/wt %, about 0.75 wt/wt % or about 1 wt/wt %. In other embodiments, the concentration is about 0.001 wt/wt % to about 1.5 wt/wt %, about 0.01 wt/wt % to about 1.5 wt/wt %, or about 0.1 wt/wt % to about 1.5 wt/wt %. For example, when the perfluorinated polymer solution is a Teflon AF2400 with a concentration of about 0.5 wt %, the resulting composite membrane has a RB rejection of >99% and an acetone permeance of 1.15 $L/m^2$-h-bar. The thickness of this perfluorinated polymer layer is about 100 nm.

The contact time of the perfluorinated polymer solution on the polymer layer (or polyolefin layer) is adjusted to be of a short duration. The inventors have found that this is advantageous as it balances the physisoption of the perfluorinated polymer on the polymer layer (or polyolefin layer) and the pore-penetration of the perfluorinated polymer into the pores of polymer (polyolefin). Accordingly, the use of pore-preserving agents can be avoided. Further, the inventors have advantageously found that a short contact time allows for a homogenous deposition, while long contact times lead to uneven deposition and increased thickness. Accordingly, in some embodiments, the contact time is less than 60 min. In other embodiments, the contact time is less than 50 min, less than 30 min, less than 20 min, less than 10 min, less than 5 min, less than 1 min, less than 30 sec or less than 20 sec. In some embodiments, the perfluorinated polymer solution is contacted on the surface of the polymer layer (or polyolefin layer) for at least 15 sec. In other embodiments, the contact time is at least 1 sec, at least 2 sec, at least 5 sec, at least 10 sec, at least 20 sec, at least 30 sec, at least 1 min, at least 5 min or at least 10 min. In other embodiments, the contact of the perfluorinated polymer solution on the polymer layer (or polyolefin layer) is instantaneous.

Figure 13:
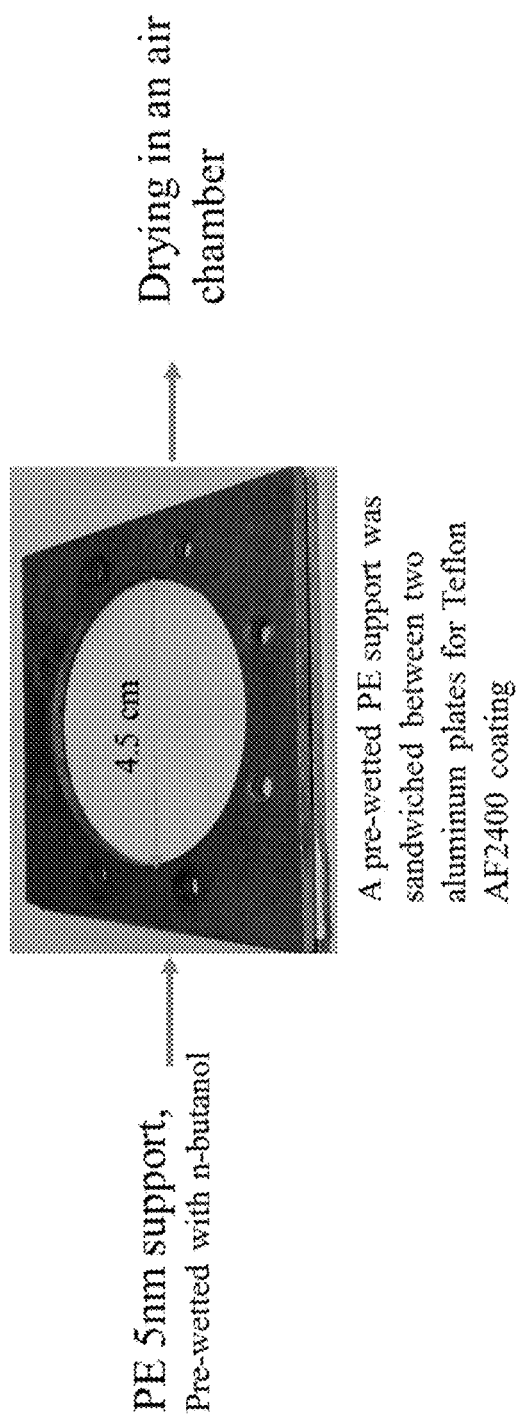
FIG. 13 illustrates a schematic of a coating device.

In some embodiments, the step of contacting perfluorinated polymer solution (step a) includes removing excess perfluorinated polymer solution. This can be performed after a desired contact time, by tilting the membrane setup as shown in FIG. 13. By controlling the contact time and the concentration of the solution, the thickness of the perfluorinated polymer layer can be accordingly controlled.

To improve the permeance, the polymer layer (or polyolefin layer) can be further modified by wetting with a solvent. Solvents wet the substrates readily, do not easily evaporate off from the membrane pores, do not damage the substrate and the subsequently formed perfluorinated film. For example, the solvent can be a solvent having a vapour pressure of less than 15 kPa at about 25° C. In some embodiments, the vapour pressure is less than 14 kPa, less than 13 kPa, less than 12 kPa, less than 10 kPa, less than 8 kPa, less than 6 kPa, less than 4 kPa, less than 2 kPa or less than 1 kPa. In some embodiments, the solvent is selected from toluene, butyl acetate, $C_3$-$C_8$ ketones, hexane, $C_3$-$C_6$ alcohol or a combination thereof. In some embodiments, the solvent is n-butanol. In some embodiments, the PE substrate is pre-wetted with n-butanol before the Teflon deposition. In this example, n-Butanol is chosen because of its combination of boiling point of 118° C., vapour pressure (0.9 kPa) and hydrophobic nature so that n-Butanol would stay inside the substrate pores during the coating. In contrast, ethanol evaporates too fast and would not stay inside the substrate pores during the formation, and is thus unsuitable. In this regard, any solvent that has a suitable boiling point and/or vapour pressure and is of a hydrophobic nature can be used. For example, the solvents can be selected from pentanol, hexanol, heptanol, octanol, nonanol, decanol, undecanol or dodecanol.

In other embodiments, the solvent has a boiling point of more than 90° C., more than 100° C., more than 110° C. or more than 120° C.

When wetted with a solvent, the resultant composite membrane has a large permeance of 1.15 $L/m^2$-h-bar whereas the rejection to RB is maintained high at 99.2%. It is believed that the increased permeance is due to less polymer intrusion into the support so that the substrate resistance is reduced with the aid of being pre-wetted with n-butanol.

Accordingly, in some embodiments, the method further comprising a step before (a) of wetting the polymer layer (or polyolefin layer) with the solvent.

In some embodiments, the method further comprises a step prior to (a) of anhydrously drying the polymer layer (or polyolefin layer) and/or perfluorinated polymer solution. To this end, the polymer layer (or polyolefin layer) and/or perfluorinated polymer solution are made to be free of water. The polymers can be separately dried to remove water on the surface or in the solution. The polymer layer (or polyolefin layer) can be further dried and cleaned with acetone. Alternatively, the polymer layer can be subjected to desiccating conditions for a period of time or be subjected to low temperature vacuum drying. The perfluorinated solvent can be distilled to reduce its water content. This is further advantageous for forming the composite membrane with lesser defects.

In some embodiments, the polymer layer (or polyolefin layer) and/or perfluorinated polymer solution have a water content of less than about 5%. In other embodiments, the water content is less than about 4%, less than about 3%, less than about 2%, less than about 1%, less than about 0.8%, less than about 0.6%, less than about 0.4%, less than about 0.2%, less than about 0.1%, or less than about 0.01%.

In some embodiments, the method further comprises a step of modifying a surface of the polymer layer (or polyolefin layer). The modification can further improve the adhesion between the deposited perfluorinated polymer and the polymer surface. The polymer layer surface can be chemically and/or physically modified. For example, the polymer layer surface can be chemically modified by conjugating functional moieties such as amine, halo, carboxyl, and oxo. The polymer layer surface can be physically modified by, for example, layering an intermediate layer between the polymer layer and the perfluorinated layer. The intermediate layer can be deposited by layer-by-layer deposition techniques, solvent casting, dip coating or spin coating. The intermediate layer can comprise a polyelectrolyte, a perfluorinated polymer, or a combination thereof.

The modification step is particularly advantageous in that it improves the physisorption of the perfluorinated polymer layer onto the polymer layer.

The present invention also relates to a composite membrane obtained by the method as disclosed herein. In this regard, the composite membrane is made by drying a perfluorinated polymer solution on a polymer layer at a relative humidity at less than 20%.

The present invention also relates to a composite membrane, comprising:
a) a polymer layer; and
b) a perfluorinated polymer layer physisorbed on a surface of the polymer layer;
wherein the perfluorinated polymer layer has a surface morphology with less than 10%/s of the surface comprising micro-structures; and
wherein the perfluorinated polymer layer has a thickness of about 5 nm to about 500 nm.

Accordingly, the composite membrane comprises:
a) a polymer layer; and
b) a perfluorinated polymer layer physisorbed on a surface of the polymer layer;
wherein polymer layer is selected from polyolefin, polyesther ether ketone (PEEK), polyethylene terephthalate (PET), Nylon, polyacrylonitrile (PAN), polytetrafluoroethylene (PTFE), polyetherimides, polyimides and their copolymers thereof;
wherein the perfluorinated polymer layer has a surface morphology with less than 10% of the surface comprising micro-structures; and
wherein the perfluorinated polymer layer has a thickness of about 5 nm to about 500 nm.

The present invention also relates to a composite membrane, comprising:
a) a polymer layer; and
b) a perfluorinated polymer layer physisorbed on a surface of the polymer layer;
wherein polymer layer is selected from polyolefin, polyesther ether ketone (PEEK), polyethylene terephthalate (PET), Nylon, polyacrylonitrile (PAN) and their copolymers thereof;
wherein the perfluorinated polymer layer has a surface morphology with less than 10% of the surface comprising micro-structures; and
wherein the perfluorinated polymer layer has a thickness of about 50 nm to about 300 nm.

The present invention also relates to a composite membrane, comprising:
a) a polyolefin layer; and
b) a perfluorinated polymer layer physisorbed on a surface of the polyolefin layer;
wherein the perfluorinated polymer layer has a surface morphology with less than 10% of the surface comprising micro-structures; and
wherein the perfluorinated polymer layer has a thickness of about 50 nm to about 300 nm.

In some embodiments, the perfluorinated polymer layer has a thickness of about 5 nm to about 500 nm. In other embodiments, the perfluorinated polymer layer has a thickness of about 5 nm to about 400 nm, about 10 nm to about 400 nm, about 15 nm to about 400 nm, about 20 nm to about 400 nm, about 30 nm to about 400 nm, about 40 nm to about 400 nm, or about 50 nm to about 400 nm. In other embodiments, the thickness is about 50 nm to about 300 nm, about 50 nm to about 200 nm or about 50 nm to about 150 nm. In other embodiments, the thickness is about 5 nm, about 10 nm, about 15 nm, about 20 nm, about 30 nm, about 40 nm, about 50 nm, about 100 nm, about 150 nm, about 200 nm, about 250 nm, about 300 nm, about 350 nm, about 400 nm, about 500 nm.

In some embodiments, the perfluorinated polymer layer has a surface morphology with less than 20% of the surface (or surface area) comprising micro-structures. These micro-structures can manifest as defects; i.e. the retention of the composite membrane is adversely affected. In other embodiments, the perfluorinated polymer layer has a surface morphology with less than 15% micro-structures, less than 10% micro-structures, less than 8% micro-structures, less than 5% micro-structures or less than 3% micro-structures. In some embodiments, the perfluorinated polymer layer has a smooth surface morphology. In this regard, the perfluorinated polymer layer has a surface morphology no (0%) micro-structures.

As used herein, 'micro-structure' refers to structures on the polymer layer which are at least micro-meter in size. In this regard, these micro-structures can be depressions, holes or bumps. In other embodiments, the micro-structures are holes. In other embodiments, the micro-structures are less than 3 μm in diameter. In other embodiments, the diameter is less than about 2 μm, about 1 μm, about 800 nm, about 500 nm, about 400 nm, about 300 nm, about 200 nm, about 100 nm, about 50 nm, about 20 nm or about 10 nm. In other embodiments, the micro-structures are at least 1 nm in diameter, at least 2 nm, at least 5 nm, at least 10 nm, at least 20 nm, at least 50 nm, at least 100 nm, at least 200 nm, at least 300 nm, at least 400 nm or at least 500 nm, up to a maximum diameter of 3 μm. The micro-structures may also be arranged in a honeycomb pattern.

As discussed above, the micro-structures are formed due to the presence of water (and/or water vapour) in the environment. The amount of water can be represented by the relative humidity (RH). It is believed that the presence of polar water molecules at the interface of the polymer layer and the non-polar perfluorinated polymer layer causes such micro-structures to form. With an increasing size of the micro-structures, its depth similarly increases. Given that the perfluorinated polymer layer is not more than 500 nm thick, large micro-structures can form through-holes which is not preferred as good retention is not obtainable.

In some embodiments, the composite membrane, comprises:
a) a polyolefin layer; and
b) a perfluorinated polymer layer physisorbed on a surface of the polyolefin layer;
wherein the perfluorinated polymer layer has a surface morphology with less than 20% of the surface comprising micro-structures;
wherein the perfluorinated polymer layer has a thickness of about 50 nm to about 300 nm; and
wherein the perfluorinated polymer in the perfluorinated polymer layer is selected from polytetrafluoroethylene (PTFE), fluorinated ethylene propylene copolymer (FEP), perfluoroalkyoxy alkane (PFA), ethylene tetrafluoroethylene (ETFE), or a copolymer thereof.

The perfluorinated polymer layer was found to be resistant to delamination from the polymer layer (or polyolefin layer). For example, exemplary composites were tested under cross-flow condition for 2 weeks (or at least 400 h) at a flow velocity of ~1.5 m/s at 10 bar at room temperature. The mechanical integrity and separation performance of the composites were still maintained after being subjected to the test conditions.

In some embodiments, the composite is stable for more than 1 week under a flow velocity of less than 3 m/s. In other embodiments, the composite is stable under a flow velocity of less than 2.5 m/s, less than 2 m/s, less than 1.5 m/s or less than 1 m/s. In other embodiments, the composite is stable for more than 2 weeks, more than 3 weeks or more than 4 weeks. In other embodiments, the composite is stable at less than 15 bar, less than 12 bar, less than 10 bar, less than 8 bar, less than 6 bar, less than 4 bar, less than 2 bar or less than 1 bar. The skilled person would know that 1 bar is equivalent to 100 kPa. In other embodiments, the composite is stable at less than 50° C., less than 45° C., less than 40° C., less than 35° C., less than 30° C., less than 25° C., less than 20° C. or less than 15° C.

Figure 6:
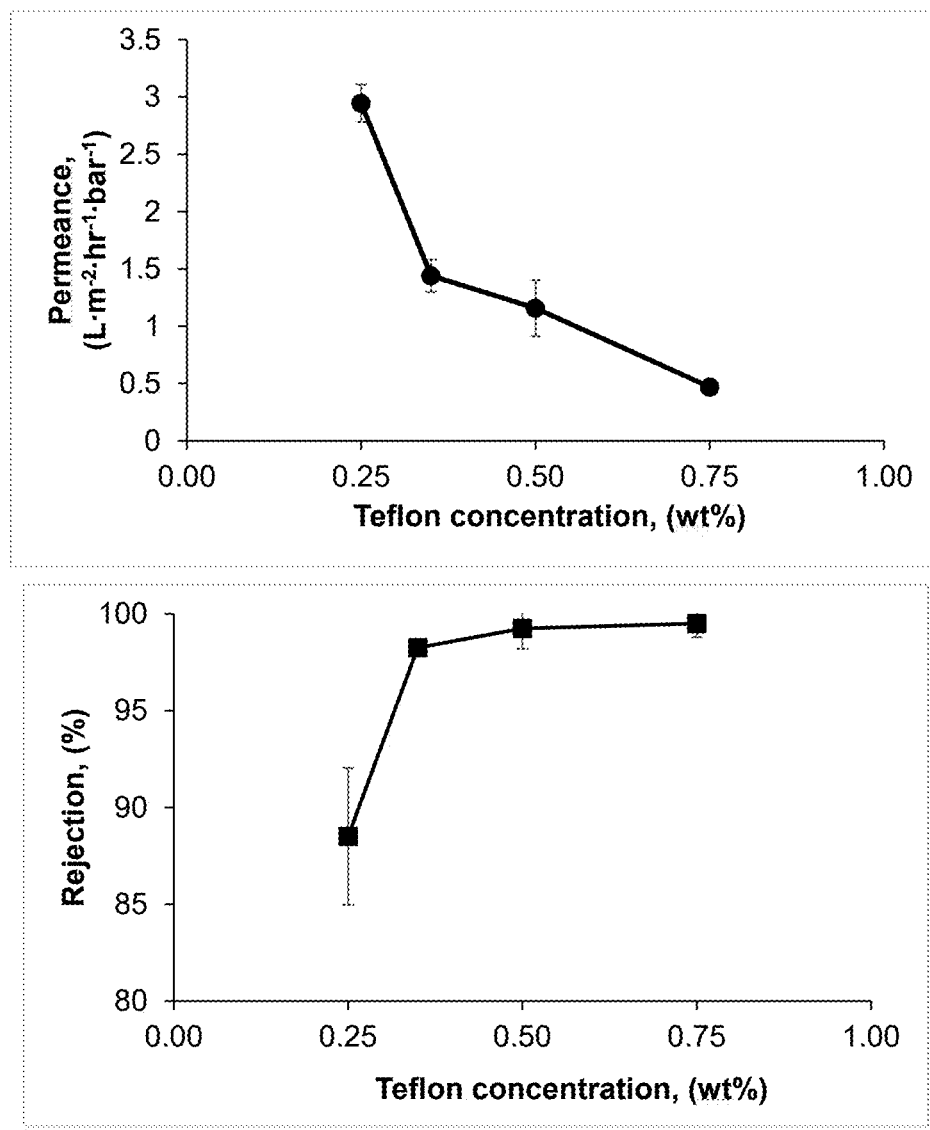
FIG. 6 illustrates separation performance of composite membranes as a function of Teflon AF2400 concentration in the coating solution under a transmembrane pressure of 10 bar at 25° C. (Feed: 50 ppm RB in acetone)

As presented in FIG. 6, the exemplary membrane prepared from a Teflon solution of 0.25 wt % has a relatively high acetone permeance of 3 L/m²-h-bar and a RB rejection of ~80%. The permeance decreases to ~1.5 L/m²-h-bar and the rejection increases to 98.1% with an increase in Teflon concentration to 0.35 wt %. A further increase in coating concentration results in a further decline in acetone permeance but an increase in RB rejection. When the Teflon concentration is 0.75 wt %, the RB rejection is ~100% due to the reduced surface defects, with permeance of 0.47 L/m²-h-bar.

Figure 7:
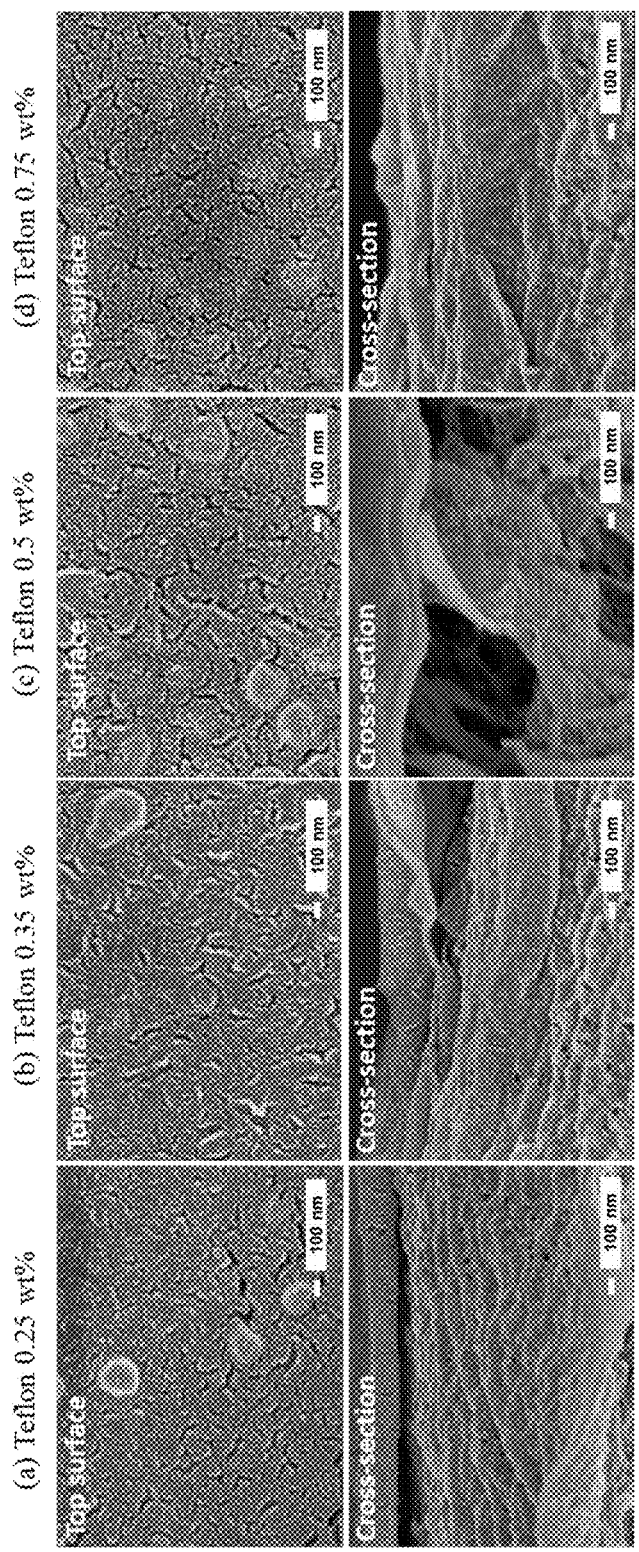
FIG. 7 illustrates membrane morphology of composite membranes coated with Teflon (PTFE AF 2400) concentrations of (a) 0.25, (b) 0.35, (c) 0.5 and (d) 0.75 wt %.

The reduced permeance arises from the fact that a higher coating concentration results in a thicker Teflon layer and a greater transport resistance. FIG. 7 shows the membrane morphology of Composite membranes as a function of Teflon coating concentration from 0.25 to 0.75 wt %. The apparent thickness of the Teflon layer increases with an increase in coating concentration. The separation performance of a membrane prepared from a Teflon solution of 0.5 wt % is as follows: an acetone permeance of 1.2 L/m²-h-bar and a RB rejection of ~99%.

Figure 8:
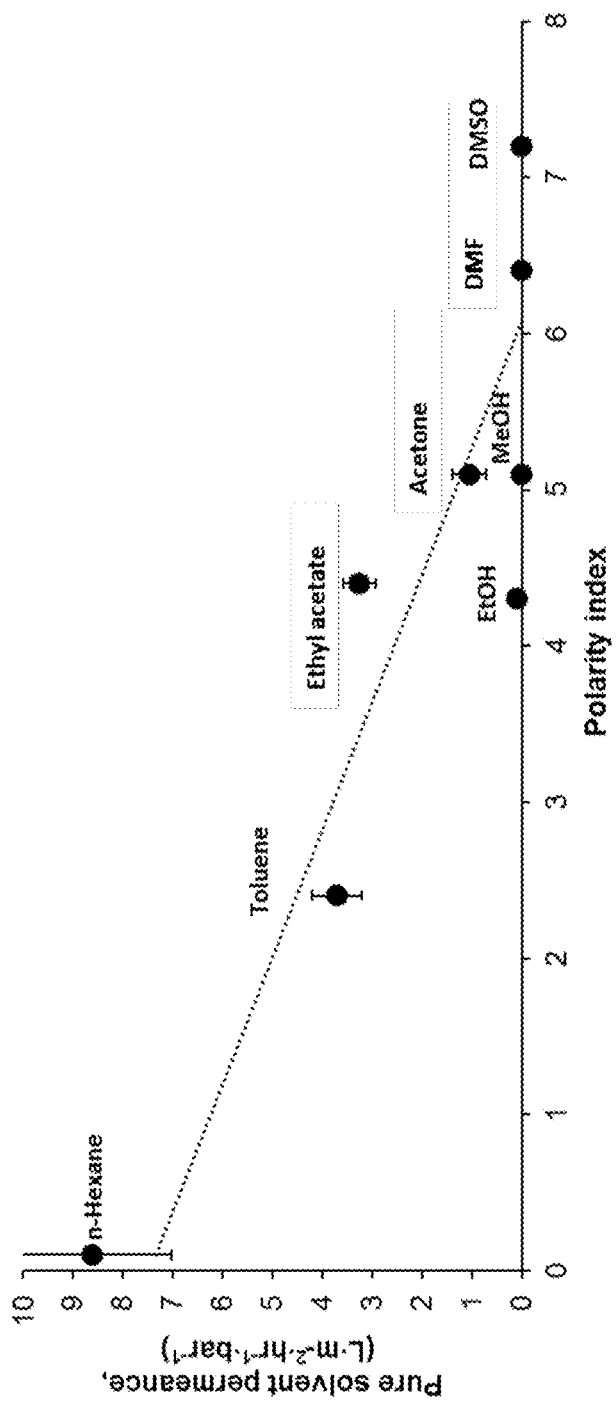
FIG. 8 illustrates pure solvent permeance of composite membrane as a function of polarity index under a transmembrane pressure of 10 bar at 25° C.

FIG. 8 plots the pure solvent permeance as a function of solvent polarity for eight different solvents, while Table 2 summarizes the details of physicochemical properties of these solvents. Different from those commercially available OSN membranes, the composite membrane of the present invention has very low permeances for solvents with high polarity such as DMF and DMSO but very high permeances for solvents with low polarity such as hexane and toluene. The preferential transport of hydrophobic solvents is attributed to the highly hydrophobic nature of Teflon AF2400 which has a low Hansen solubility parameter for polarity (i.e., 5.07 MPa$^{1/2}$ calculated with aid of HSPiP software). The pure solvent permeances are also closely related to solvent viscosity. For example, ethanol possesses a much higher viscosity than ethyl acetate, thus the former has a much lower solvent permeance than the latter (i.e., 0.1 vs. 3.3 L/m²-h-bar) even though both have similar polarity indices. Compared to commercial membranes, composite membrane of the present invention has higher permeances of 3.3, 3.7 and 8.6 L/m²-h-bar for ethyl acetate, toluene and hexane respectively.

TABLE 2

Physiochemical properties of the selected organic solvents.

| Solvent | Polarity index | Viscosity[b] (cP) | Molar volume,[b] (cm³/mol) | Hansen solubility parameter[c] $\delta_{Tot}$, (MPa$^{-1/2}$) |
| --- | --- | --- | --- | --- |
| DMSO | 7.2 | 1.996 | 71.3 | 26.6 |
| DMF | 6.4 | 0.8967 | 77.1 | 24.6 |
| Toluene | 2.4 | 0.5780 | 105.7 | 18.2 |
| Acetone | 5.1 | 0.3116 | 74.1 | 19.3 |
| MeOH | 5.1 | 0.5686 | 40.6 | 29.6 |
| Ethyl acetate | 4.4 | 0.4338 | 98.5 | 18.1 |
| EtOH | 4.3 | 1.017 | 58.2 | 25.0 |
| Hexane | 0.1 | 0.3071 | 130.5 | 14.9 |

[b] Viscosity and density are obtained from Aspen HYSYS software at 22° C. and 5 bar. Molar volume is calculated based on density and molecular weight.
[c] Hansen solubility parameters are obtained from HSPiP software. Teflon AF2400's Hansen solubility parameter $\delta_{Tot}$: 16.1 MPa$^{-1/2}$.

In some embodiments, the composite membrane has a permeance of at least 2 L/m²-h-bar for hydrophobic solvents such as toluene and hexane. In other embodiments, the permeance is at least 2.5 L/m²-h-bar, at least 3 L/m²-h-bar, at least 3.5 L/m²-h-bar or at least 4 L/m²-h-bar. In other embodiments, the composite membrane has no or low permeance for polar solvents like methanol, DMF and DMSO.

Accordingly, in some embodiments, the composite membrane has an acetone permeance of at least 0.4 L/m²-h-bar. The acetone can be a pure acetone (100% acetone) or at least 95% acetone. In other embodiments, the acetone permeance is at least 0.5 L/m²-h-bar, at least 0.7 L/m²-h-bar, at least 1 L/m²-h-bar, at least 1.1 L/m²-h-bar, at least 1.5 L/m²-h-bar, at least 2 L/m²-h-bar, at least 2.5 L/m²-h-bar or at least 3 L/m²-h-bar.

In some embodiments, the composite membrane has an ethyl acetate permeance of at least 0.4 L/m²-h-bar. The ethyl acetate can be a pure ethyl acetate (100% ethyl acetate) or at least 95% ethyl acetate. In other embodiments, the ethyl acetate permeance is at least 0.5 L/m²-h-bar, at least 0.7 L/m²-h-bar, at least 1 L/m²-h-bar, at least 1.5 L/m²-h-bar, at least 2 L/m²-h-bar, at least 2.5 L/m²-h-bar, at least 3 L/m²-h-bar or at least 3.3 L/m²-h-bar.

In some embodiments, the composite membrane has a toluene permeance of at least 0.4 L/m²-h-bar. The toluene can be a pure toluene (100% toluene) or at least 95% toluene. In other embodiments, the toluene permeance is at least 0.5 L/m²-h-bar, at least 0.7 L/m²-h-bar, at least 1 L/m²-h-bar, at least 1.5 L/m²-h-bar, at least 2 L/m²-h-bar, at least 2.5 L/m²-h-bar, at least 3 L/m²-h-bar, at least 3.5 L/m²-h-bar or at least 3.7 L/m²-h-bar.

In some embodiments, the composite membrane has a hexane permeance of at least 0.4 L/m²-h-bar. The hexane can be a pure hexane (100% hexane) or at least 95% hexane. In other embodiments, the hexane permeance is at least 0.5 L/m²-h-bar, at least 0.7 L/m²-h-bar, at least 1 L/m²-h-bar, at least 1.5 L/m²-h-bar, at least 2 L/m²-h-bar, at least 2.5 L/m²-h-bar, at least 3 L/m²-h-bar, at least 3.5 L/m²-h-bar, at least 4 L/m²-h-bar, at least 4.5 L/m²-h-bar, at least 5 L/m²-h-bar, at least 5.5 L/m²-h-bar, at least 6 L/m²-h-bar, at least 6.5 L/m²-h-bar, at least 7 L/m²-h-bar, at least 7.5 L/m²-h-bar, at least 8 L/m²-h-bar or at least 8.6 L/m²-h-bar.

Figure 9:
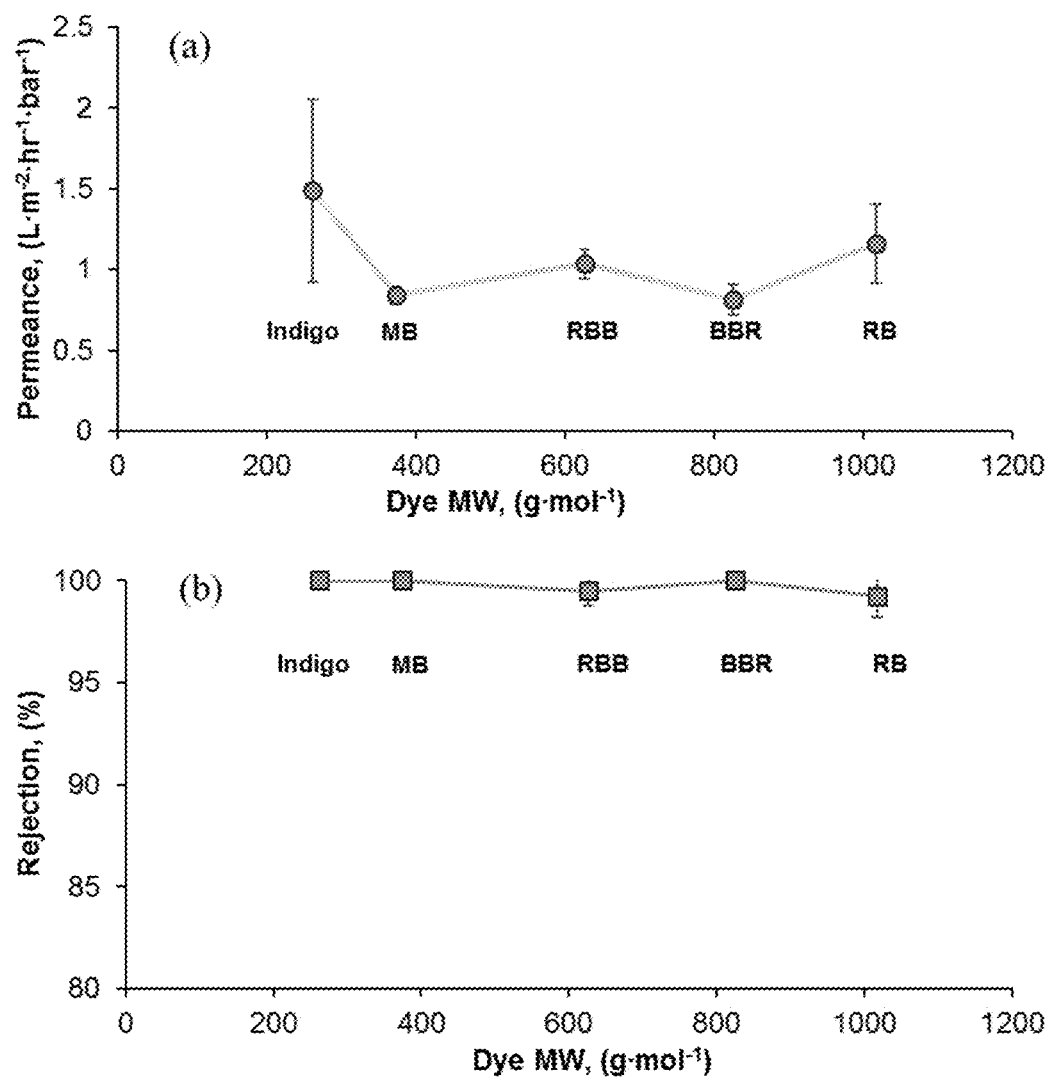
FIG. 9 illustrates (a) the permeances and (b) the rejections of solutes in acetone of composite membrane under a transmembrane pressure of 10 bar at 25° C. (Feed: 50 ppm dye in acetone)

FIG. 9 shows the performance of an exemplary composite membrane to separate various dyes in acetone. Generally, the membrane has high rejections to compounds with a MW varying from 262 to 1017 g/mol (Table 3) and its permeances fluctuate in a narrow range of 0.8-1.5 L/m²-h-bar.

Interestingly, the membrane has slightly lower rejections to negatively charged dyes with a larger MW such as RBB and RB than the other positively charged or neutral dyes. The slightly lower rejections to the negatively charged dyes are probably because the Teflon membrane has a preference to attract anions.

TABLE 3

Physicochemical properties of the selected solute molecules.

| Compounds | MW (g/mol) | Charge characteristics | Hansen solubility parameter [a] |
|---|---|---|---|
| Rose Bengal (RB) | 1017.6 | negative | 27.1 |
| Brilliant blue R (BBR) | 825.9 | negative | 24.4 |
| Remazol brilliant blue R (RBB) | 626.5 | negative | 29.4 |
| Methylene blue (MB) | 373.9 | positive | 22.0 |
| Indigo | 262.0 | neutral | 29.1 |
| Diethylene glycol (DEG) | 106.1 | neutral | 29.1 |
| Triethylene glycol (TEG) | 150.2 | neutral | 25.9 |
| Poly(ethylene glycol) 200 (PEG 200) | ~200 | neutral | 24.0 |

In some embodiments, the composite membrane has a solute rejection of at least 80%. In other embodiments, the rejection is at least 85%, at least 90%, at least 92%, at least 94%, at least 96%, at least 98% or at least 99%.

Figure 10:
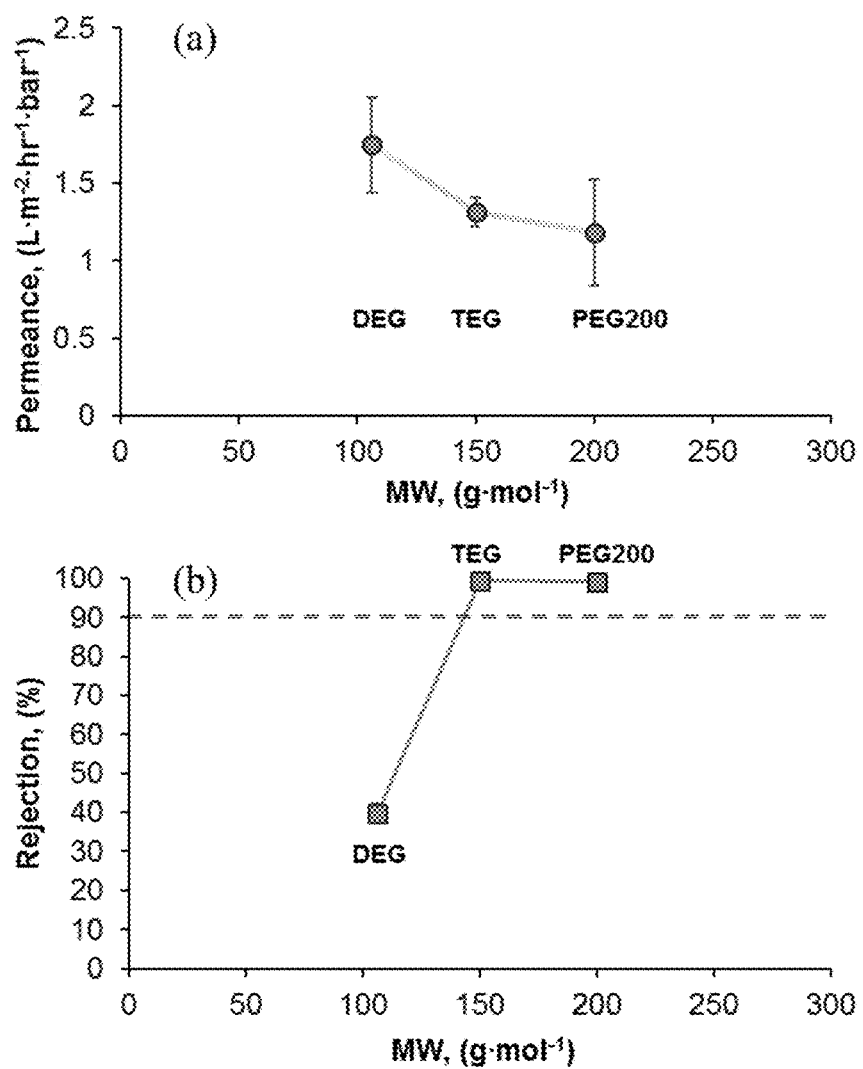
FIG. 10 illustrates (a) the permeances and (b) the rejections of DEG/TEG/PEG 200 in acetone of composite membrane under a transmembrane pressure of 10 bar at 25° C. (Feed: 500 ppm DEG/TEG/PEG in acetone)

To determine the MWCO of the membrane, neutral charged DEG, TEG and PEG with MWs of 106, 150 and 200 g/mol (Table 3) were used as solutes. As indicated in FIG. 10, the membrane has a very low MWCO of ~150 g/mol. Moreover, it has much higher solvent permeances than commercially available membranes. For example, Duramem 150 and Duramem 300 has pure acetone permeances of ~0.14 and ~0.15 $L/m^2$-h-bar respectively as compared to ~1.2 $L/m^2$-h-bar of composite membrane as disclosed herein. It is worthy to note that OSN membranes with a low MWCO and a high permeance are still rarely available.

In some embodiments, having a molecular weight cut-off (MWCO) of at least 150 g/mol in acetone. In other embodiments, the MWCO is at least 200 g/mol, at least 300 g/mol, at least 400 g/mol, at least 500 g/mol, at least 600 g/mol, at least 700 g/mol, at least 800 g/mol, at least 900 g/mol or at least 1000 g/mol.

Figure 11:
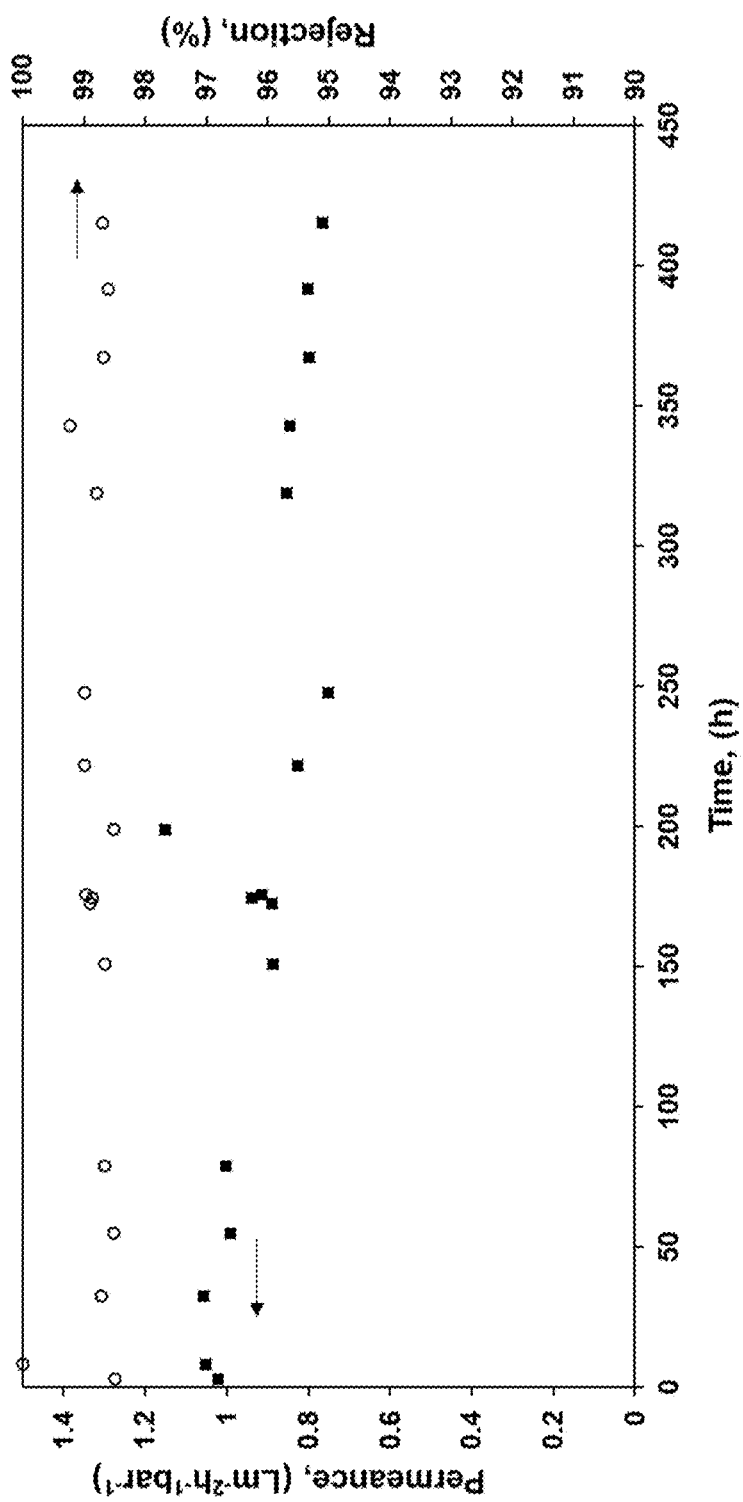
FIG. 11 illustrates the separation performance of composite membrane over time under a transmembrane pressure of 10 bar at 25° C. using a cross-flow set up (Feed: 50 ppm RB in acetone)

The performance stability of an exemplary composite membrane was also tested over 400 h using an acetone/RB mixture as the feed and a cross-flow set-up under 10 bar at room temperature. FIG. 11 shows the evolution of permeance and rejection with time. The RB rejection stays always more than 98.5% throughout the entire test, while the permeance shows a gradual decline over time, probably due to the surface fouling over the 2-week test. Overall, the membrane displays impressively stable separation performance over the testing period.

In some embodiments, the composite membrane has a performance stability of at least 300 h. In other embodiments, the performance stability is at least 350 h, at least 400 h, at least 450 h, at least 500 h, at least 550 h, at least 600 h, at least 700 h, at least 800 h, at least 900 h or at least 1000 h.

As the composite membranes have high permeances for hydrophobic solvents, the recovery of solvents such as n-hexane and acetone from oil/solvent mixtures is explored. An industrial oil sample containing triglycerides (TG) provided by GIIAVA Pte Ltd was used. FIG. 12 summarizes the separation performance of the composite membrane as well as displays the color changes from the oil/solvent feeds to the permeates, visibly indicating the successful separation between oil and solvents. The membrane has permeances of 0.36 and 1.50 $L/m^2$-h-bar for acetone and n-hexane respectively using 20 wt % oil/solvent mixtures as feeds. Based on HPLC analyses, the rejections to TG are 99.5% for both feeds. Table 4 benchmarks our membrane with other OSN membranes. The TG rejections and solvent permeances of other membranes are in the range of 70-97% and 0.04-3.50 $L \cdot m^{-2} \cdot h^{-1} \cdot bar^{-1}$. In comparison, the presently disclosed membrane has one of the highest rejections to TG while it has a good hexane permeance. Clearly, the presently disclosed membrane is promising for the solvent recovery in the edible oil industry.

TABLE 4

A comparison of separation performance between Composite membrane and the other OSN membranes for the separation of oil/solvent mixtures.

| Membrane | Membrane material | Feed | Test pressure (bar) | Test temperature (° C.) | Permeance, ($L/m^2$ h bar) | Oil rejection, (%) |
|---|---|---|---|---|---|---|
| STARMEM™ 122 | Cross-linked polyimide(PI) | Cooking oil/acetone (10 wt %) | 20 | Room temperature | 3.50 | 70 |
| SOLSEP NF030306 | Silicone/cross-linked PI | Cooking oil/acetone (10 wt %) | 20 | Room temperature | 1.05 | 78 |
| PAA crosslinked BPAPEEK | Poly(ether ether ketone) | Sunflower oil/acetone (10 wt %) | 10 | Room temperature | 0.04 | 94 |
| Duramem 500 | Cross-linked polyimide(PI) | Soybean oil/acetone (20 wt %) | 10 | Room temperature | 0.14 | 84 |
| Puramem 280 | Polyimide | Rapeseed oil/ethanol (65 wt %) | 40 | 40 | 0.15 | 97 |
| STARMEM™ 240 | Polyimide | Rapeseed oil/ethanol (65 wt %) | 40 | 40 | 0.14 | 91 |

TABLE 4-continued

A comparison of separation performance between Composite membrane and
the other OSN membranes for the separation of oil/solvent mixtures.

| Membrane | Membrane material | Feed | Test pressure (bar) | Test temperature (° C.) | Permeance, (L/m² h bar) | Oil rejection, (%) |
|---|---|---|---|---|---|---|
| PDMS/PVDF composite | PDMS | Soybean oil/hexane (25 wt %) | 20 | 30 | 1.02 | 80 |
| PDMS/PAN composite | PDMS | Sunflower oil/hexane (30 wt %) | 7 | 20 | 1.1 | ~87 |
| This work | Teflon AF2400 | Soybean oil/n-hexane (20 wt %) | 10 | 25 | 1.5 | 99.9 |

In some embodiments, the composite membrane has a rejection of at least 95% of triglycerides at a concentration of 20 wt % in n-hexane.

The present invention relates to a method of filtrating a mixture, the mixture comprising a chemical compound which is miscible or dissolved in a fluid, the method comprising:
a) contacting the mixture with a composite membrane as disclosed herein; and
b) applying a pressure across the composite membrane.

Through the use of the composite membrane, the chemical compound can be separated from the fluid, either by the permeance of the chemical compound through the composite membrane, or by the permeance of the fluid through the composite membrane.

The present invention also relates to a method of filtrating a chemical compound from a mixture, the mixture comprising the chemical compound and a liquid, the method comprising:
a) contacting the mixture with a composite membrane as disclosed herein; and
b) applying a pressure across the composite membrane.

Pressure is the force applied perpendicular to the surface of an object per unit area over which that force is distributed. In some embodiments, the pressure is applied such that the pressure gradient is in a direction from the perfluorinated polymer layer to the polymer layer (or polyolefin layer). In other embodiments, the pressure is applied such that the pressure gradient is in a direction from the polymer layer (or polyolefin layer) to the perfluorinated polymer layer. In other embodiments, the pressure is about 10 kPa to about 5000 kPa. In other embodiments, the pressure is about 100 kPa to about 5000 kPa, about 500 kPa to about 5000 kPa, about 1000 kPa to about 5000 kPa, about 1000 kPa to about 4500 kPa, about 1000 kPa to about 4000 kPa, about 1000 kPa to about 3500 kPa, about 1000 kPa to about 3000 kPa, about 1000 kPa to about 2500 kPa, or about 1000 kPa to about 2000 kPa. kPasure could be as high as 5000 kpa in some cases).

The composite membrane is suitable for nanofiltration applications with high rejections to small MW hydrocarbon compounds which may be relevant to refinery operations.

The composite membrane of the present invention can be applied in the oleochemical industry. Based on market validation, glycerine (glycerol) dehydration is a significant energy-intensive separation process and a more efficient alternative process is highly sought after. When tested with Teflon/PE flat sheet membrane and Teflon/Ultem hollow fiber membranes, the membranes demonstrated high separation performance for water removal from glycerine by pervaporation as shown in Table 5 below. Pervaporation is a process for separating mixtures of liquids by partial vaporization through a membrane. It usually comprises two steps: (a) permeation through the membrane by the permeate, then (b) its evaporation into the vapor phase. The membrane acts as a selective barrier between the two phases: the liquid-phase feed and the vapor-phase permeate. It allows the desired component(s) of the liquid feed to transfer through it by vaporization. Separation of components is based on a difference in transport rate of individual components through the membrane.

TABLE 5

Separation performance of Composite membrane
for the separation of water/glycerine mixtures.

| Membrane | Test temp. (° C.) | Feed glycerine (wt. %) | Flux (kg/m²h) | Permeate water (wt. %) | Separation factor (Water/glycerine) |
|---|---|---|---|---|---|
| Teflon/Polyethylene | 25 | 50 | 1.34 | 99.93 | 1534 |
| Teflon/Ultem 1010 hollow fiber | 25 | 50 | 0.284 | 99.90 | 1050 |

Accordingly, the present invention also relates to a method of filtrating a mixture by pervaporation, the mixture comprising at least two fluids, the method comprising:
a) contacting the mixture with a composite membrane as disclosed herein; and
b) applying a pressure across the composite membrane.

In some embodiments, the composite membrane has a water flux of at least about 0.2 kg/m²-h. The water flux can be for dehydration of 50 wt % glycerine solution at 25° C. In other embodiments, the water flux is at least about 0.4 kg/m²-h, about 0.6 kg/m²-h, about 0.8 kg/m²-h, about 1 kg/m²-h, about 1.2 kg/m²-h, about 1.3 kg/m²-h, about 1.4 kg/m²-h, or about 1.5 kg/m²-h.

In other embodiments, the composite membrane has water/glycerine separation factor of at least 1000. In other embodiments, the separation factor is at least about 1100, about 1200, about 1300, about 1400, about 1500, or about 1600.

The composite membranes can be applied in desalination and solvent removal from solvent gas mixture applications.

In some embodiments, the mixture can be a gas and vapour mixture. For example, the vapour can be a solvent vapour. The solvent vapour is a solvent in its gaseous state. In this regard, the method is a method of filtrating a gas from a solvent vapour. The solvent vapour mixture comprises a solvent vapour and a gas. Accordingly, when a pressure is applied across the composite membrane, the gas can for example permeate through the composite membrane and be separated from the solvent. For example, $N_2$ can permeate through the membrane faster than a hexane solvent vapour.

Accordingly, the present invention also relates to a method of filtrating a gas and vapour mixture, the method comprising:
a) contacting the mixture with a composite membrane as disclosed herein; and
b) applying a pressure across the composite membrane.

In some embodiments, the mixture is a mixture of water and a solvent. Water can be removed by contacting the mixture with a composite membrane as disclosed herein, and applying a vacuum or a sweeping gas at a downstream end of the composite membrane.

In some embodiments, the mixture is a mixture of a salt and a solvent. The solvent can be water. Salt can be removed from a salt water mixture by contacting the mixture with a composite membrane as disclosed herein, and applying a vacuum or a sweeping gas at the downstream of the composite membrane.

EXAMPLES

Materials

Teflon AF2400 was acquired from Chemours Company. The solvent for Teflon AF2400, Galden HT80, was purchased from App Systems Pte. Ltd. The PE membranes with an asymmetric structure and a nominal pore size of 5 nm was supplied by Entegris Inc. Acetone, acetonitrile, and isopropanol with a high performance liquid chromatography (HPLC) grade and methanol (MeOH), ethanol (EtOH), dimethyl sulfoxide (DMSO), dimethyl formamide (DMF), ethyl acetate, toluene, n-hexane and n-butanol with an analytical reagent (AR) grade were ordered from Sigma Aldrich. Rose Bengal (RB, MW=1017.6 g/mol), brilliant blue R (BBR, MW=825.9 g/mol), remazol brilliant blue R (RBB, MW=626.5 g/mol), methylene blue (MB, MW=373.9 g/mol), indigo (MW=262.0 g/mol), diethylene glycol (DEG, MW=106.1 g/mol), triethylen glycol (TEG, MW=150.2), poly(ethylene glycol) 200 (PEG 200, MW=200 g/mol) were bought from Sigma and employed as model solutes for the performance study of OSN membranes.

An oil sample that contained triglycerides (TG) was provided by GIIAVA Pte Ltd. The oil was firstly dissolved in either acetone or n-hexane and then filtered through a 1-µm PTFE filter to remove undissolved compounds. The filtered oil solutions were used as feeds for OSN tests. An analytical grade glyceryl trilinoleate was acquired from Sigma Aldrich for the identification and calibration by means of HPLC.

Membrane Preparation

A PE substrate support was sandwiched between two aluminium frames (FIG. 13). The membrane was optionally pre-wetted with n-butanol, followed by coating its top surface with a Teflon AF2400/Galden HT80 solution in an air drying chamber. The detailed description of the drying chamber is as disclosed in Journal of Membrane Science, 581 (2019) 114-122, the disclosure of which is incorporated by reference herein. Briefly, a 1.5 ml of Teflon solution was dispersed on top of the pre-wetted membrane surface and stayed still for 15 seconds and then the solution was poured off. Subsequently, the membrane was dried in a drying chamber at 25° C. for at least 10 min with air of various RH at an air speed of 0.05 m/s (FIG. 1). The membranes were stored at the ambient conditions before further tests and characterizations.

Characterizations

The membrane morphology was observed by using a JSM-6700F field-emission scanning electron microscope (FESEM). To understand the roughness and topology of membrane surface, an atomic force microscope (AFM, Acoustic AC) with the tapping mode was employed. Two membranes were examined for each condition. For each membrane, an area of 2×2 µm² was scanned at a rate of 1 Hz. The mean roughness $R_{ms}$ was calculated based on the AFM measurements.

OSN Experiments

Dead-End Cell Testing

The solvent permeance and solute rejection of membranes were measured by a dead-end permeation cell with a volume of 300 cm³ under 10 bar at 25° C. with magnetic stirring at 1000 rpm to minimize the concentration polarization. Its detailed design can be referred to elsewhere [30, 31]. The permeate samples were weighed by a precision balance (Denver Instrument, TB214). The permeance (P, Lm$^{-2}$ h$^{-1}$ bar$^{-1}$) was then calculated by Equation (1):

$$P = \frac{Q}{A \times \Delta P} \qquad (1)$$

where Q denotes the volumetric flow rate (Lh$^{-1}$) of the permeate solvent, A refers to the effective filtration area (m²), and ΔP represents the trans-membrane pressure (bar).

The solute rejection, R (%), was calculated by Equation (2). The solute concentrations of TG, DEG, TEG and PEG were measured utilizing an HPLC (Agilent LC1260II). The solute concentrations of dyes were measured by a UV-Vis spectrometer (GENESYS 10S UV-Vis Fisher Scientific Pte Ltd).

$$R = \left(1 - \frac{C_P}{C_F}\right) \times 100\% \qquad (2)$$

where $C_P$ and $C_F$ are the solute concentrations of the permeate and feed solutions, respectively.

Cross-Flow Testing

A cross-flow apparatus with a volume of 1000 cm³ was used for the experiments at 25° C. It had a membrane area of 7.06 cm² and a flow of 20 l/min was circulated through the permeation cell. Each experiment was conditioned for 2 h before the data were reported. Stability tests were conducted for 2 weeks using the cross-flow device. The membrane was tested during the day while immersed in the feed solution without applying any pressure during the night. Except the small samples being collected for UV tests, the permeate samples were returned to the feed solution tank.

HPLC Method

An HPLC (Agilent LC1260II) with a reverse column, HP-BC-Poroshell 120 EC-C18, was used to analyze TG, DEG, TEG and PEG in the feed and permeate samples. An acetonitrile and isopropanol mixture with a volumetric ratio of 7:3 was used as the mobile phase flow at 1.7 ml/min at room temperature whereas a sample of 10 µL was injected into the HPLC at room temperature. An evaporative light scattering detector (ELSD) was used for detecting the compounds. n-Hexane in oil/n-hexane samples were evaporated off and reconstituted with acetone before tests. Oil feed samples were diluted to twenty times with acetone before being tested with HPLC.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of fabricating a composite membrane comprising a perfluorinated polymer layer physisorbed on a surface of a polymer substrate layer, the method, comprising:
   a) contacting a perfluorinated polymer solution with a surface of the polymer substrate layer in a drying chamber; and
   b) drying the perfluorinated polymer solution in the drying chamber to form the perfluorinated polymer layer physisorbed on the surface of the polymer substrate layer;
   wherein the perfluorinated polymer solution comprises a perfluorinated polymer and a $C_5$-$C_{18}$ perfluorinated solvent;
   wherein the perfluorinated polymer solution is dried under an air flow of about 0.05 m/s to about 1.5 m/s, at a relative humidity of less than 20% and at ambient temperature in order to form the perfluorinated polymer layer, the layer having a surface morphology of 0% to 10% of its surface comprising micro-structures;
   wherein the perfluorinated polymer layer has a thickness of about 5 nm to about 500 nm;
   wherein the perfluorinated polymer layer comprises a perfluorinated polymer or a copolymer or blend thereof; and
   wherein the polymer substrate layer comprises a non-perfluorinated polymer, or copolymer, or blend thereof.

2. The method according to claim 1, wherein the polymer substrate layer is selected from polyolefin, polyester ether ketone (PEEK), polyethylene terephthalate (PET), Nylon, polyacrylonitrile (PAN) and copolymers and blends thereof.

3. The method according to claim 1, wherein the solution is dried at a relative humidity of 0%.

4. The method according to claim 1, wherein the perfluorinated polymer solution is dried under an air flow of about 0.05 m/s.

5. The method according to claim 1, wherein the $C_5$-$C_{18}$ perfluorinated solvent is a perfluorinated polyether solvent having a boiling point of 110° C.

6. The method according to claim 1, wherein the perfluorinated polymer in the perfluorinated polymer solution has a concentration of about 0.001 wt/wt % to about 1.5 wt/wt %.

7. The method according to claim 1, wherein the perfluorinated polymer in the perfluorinated polymer solution is selected from polytetrafluoroethylene (PTFE), fluorinated ethylene propylene copolymer (FEP), perfluoroalkyoxy alkane (PFA), ethylene tetrafluoroethylene (ETFE), or a copolymer thereof.

8. The method according to claim 1, wherein the perfluorinated polymer solution is contacted with the surface of the polymer substrate layer for at least 5 sec.

9. The method according to claim 1, wherein the step of contacting perfluorinated polymer solution (step a) includes removing excess perfluorinated polymer solution.

10. The method according to claim 1, wherein step b) is performed for at least 10 sec.

11. The method according to claim 1, further comprises a step before step a) of wetting the polymer substrate layer or polyolefin layer with a solvent having a boiling point of more than 90° C. wherein the solvent is n-butanol.

12. The method according to claim 1, further comprises a step prior to step a) of anhydrously drying the polymer substrate layer and perfluorinated polymer solution.

* * * * *